(12) United States Patent
Davis et al.

(10) Patent No.: US 11,634,322 B2
(45) Date of Patent: Apr. 25, 2023

(54) INTEGRATION OF THERMOCHEMICAL WATER SPLITTING WITH CO2 DIRECT AIR CAPTURE

(71) Applicants: California Institute Of Technology, Pasadena, CA (US); University Of Delaware, Newark, DE (US)

(72) Inventors: Mark E. Davis, Pasadena, CA (US); Bingjun Xu, Pasadena, CA (US); Casper O. Brady, Newark, DE (US)

(73) Assignees: California Institute of Technology, Pasadena, CA (US); University of Delaware, Newark, DE (US)

( * ) Notice: Subject to any disclaimer, the term of this patent is extended or adjusted under 35 U.S.C. 154(b) by 415 days.

(21) Appl. No.: 16/837,450

(22) Filed: Apr. 1, 2020

(65) Prior Publication Data

US 2020/0317512 A1    Oct. 8, 2020

Related U.S. Application Data

(60) Provisional application No. 62/923,824, filed on Oct. 21, 2019, provisional application No. 62/828,671, filed on Apr. 3, 2019.

(51) Int. Cl.
*B01D 53/62*  (2006.01)
*B01D 53/73*  (2006.01)
(Continued)

(52) U.S. Cl.
CPC .............. *C01B 3/063* (2013.01); *B01D 53/62* (2013.01); *B01D 53/80* (2013.01);
(Continued)

(58) Field of Classification Search
None
See application file for complete search history.

(56) References Cited

U.S. PATENT DOCUMENTS

| 7,960,063 B2 | 6/2011 | Manousiouthakis et al. |
| 8,940,269 B2 | 1/2015 | Davis et al. |

(Continued)

FOREIGN PATENT DOCUMENTS

| EP | 0188115 A1 | 7/1986 |
| WO | 97/05062 A1 | 2/1997 |

(Continued)

OTHER PUBLICATIONS

Azad et al., A novel determination of thermodynamic activities of metals in an AISI 316 stainless steel by a metastable emf method", J. Nucl Mater, 1987, 144, 94-104."

(Continued)

*Primary Examiner* — Daniel Berns
(74) *Attorney, Agent, or Firm* — BakerHostetler

(57) ABSTRACT

The present disclosure is directed to the integration of direct air capture of carbon dioxide with thermochemical water splitting, the latter optionally driven by solar energy. The disclosure is also directed to a process comprising extracting carbon dioxide from an air stream by contacting the airstream with an alkali metal ion-transition metal oxide of empirical formula $A_xMO_2$ ($0.1 < x \leq 1$), where A represents the alkali metal ion comprising sodium ion, potassium ion, or a combination thereof and M comprises iron, manganese, or a combination thereof to form a transition metal composition comprising an oxidized ion extracted-transition metal oxide.

26 Claims, 11 Drawing Sheets

(51) Int. Cl.
  *B01D 53/80*   (2006.01)
  *C01B 3/06*   (2006.01)
  *C01B 3/10*   (2006.01)
  *C01B 13/02*   (2006.01)
  *C01B 32/50*   (2017.01)

(52) U.S. Cl.
  CPC .......... *C01B 13/0207* (2013.01); *C01B 32/50* (2017.08); *B01D 2251/304* (2013.01); *B01D 2251/602* (2013.01); *B01D 2257/504* (2013.01); *B01D 2258/06* (2013.01)

(56) References Cited

U.S. PATENT DOCUMENTS

| | | |
|---|---|---|
| 9,206,042 B2 | 12/2015 | Davis et al. |
| 9,266,057 B1 | 2/2016 | Jones |
| 2009/0104111 A1 | 4/2009 | Collins et al. |
| 2010/0137457 A1 | 6/2010 | Kaplan |
| 2011/0300064 A1 | 12/2011 | Takeshima |
| 2013/0252808 A1 | 9/2013 | Yamazaki et al. |
| 2013/0266502 A1 | 10/2013 | Lichty et al. |
| 2013/0266504 A1 | 10/2013 | Davis |
| 2015/0306564 A1 | 10/2015 | Kwon et al. |
| 2017/0267538 A1 | 9/2017 | Novek |

FOREIGN PATENT DOCUMENTS

| | | |
|---|---|---|
| WO | 2010/016641 A1 | 2/2010 |
| WO | 2013/019167 A1 | 2/2013 |
| WO | 2013/151973 A1 | 10/2013 |

OTHER PUBLICATIONS

Fashihi et al., "Techno-economic assessment of CO2 direct air capture plants", J. Cleaner Prod., 2019, 224, 957-980.

Lide, Standard Thmnodynamic Properties of Chemical Substances", CRC Handbook of Chemistry and Physics, 2008, 5-42, 1 page."

Omomo et al., Preparation of protonic layered manganates and their intercalation behavior", Solid State Ionics, 2002, 151, 243-250."

Xu et al., "Spinel Metal Oxide-Alkali Carbonate-Based, Low-Temperature Thermochemical Cycles for Water Splitting and Carbon Dioxide Reduction", Chem. Mater., 2013, 25, 1564-1571.

Xu et al., Low-temperature, manganese oxide-based, thermochemical water splitting cycle", PNAS, Jun. 12, 2012, vol. 109, No. 24, 9260-9264."

Bayon et al., "Exploring the Alternative MnO—Na2CO3 Thermochemical Cycle for Water Splitting", Journal of CO2 Utilization, 2020, vol. 42, No. 101264, pp. 11.

Brady et al., "Integration of Thermochemical Water Splitting with CO2 Direct Air Capture", PNAS, 2019, vol. 116, No. 50, pp. 25001-25007.

Varsano et al., "Optimized Reactants Mixture and Products Hydrolysis in the Manganese Oxide Thermochemical Cycle", Proceedings of ES2009, ASME 3rd International Conference on Energy Sustainability, 2009, ES2009-90257, 5 pages.

INTEGRATION OF THERMOCHEMICAL WATER SPLITTING WITH CO2 DIRECT AIR CAPTURE

CROSS REFERENCE TO RELATED APPLICATIONS

This application claims priority to U.S. Patent Application Nos. 62/828,671, filed Apr. 3, 2019, and 62/923,824, filed Oct. 21, 2019, the contents of which are incorporated in their entireties for all purposes.

TECHNICAL FIELD

The present disclosure is directed to the integration of direct air capture of carbon dioxide with thermochemical water splitting, the latter optionally driven by solar energy.

Anthropogenic global warming resulting from rising atmospheric $CO_2$ concentrations is considered an imminent threat to society. To address rising $CO_2$ concentrations, effective capture of $CO_2$ directly (Direct Air Capture, or DAC) from the atmosphere is likely to be necessary. This disclosure describes the integration of direct air capture $CO_2$ and water splitting to produce a mixture of $CO_2$ and $H_2$ via a thermochemical water splitting cycle. This mixture can, in turn, be used to produce valuable chemicals by known technologies (for example, the generation of hydrocarbon feedstocks by syn-gas technologies). The present disclosure demonstrates via experimental investigations and a techno-economic analysis that the integration of the two technologies into a single overall process has the potential to become economically favorable in some situations.

BACKGROUND

Atmospheric carbon dioxide levels have increased significantly in modern times (FIG. 1). Anthropogenic climate change is increasingly recognized as a serious and imminent threat to the prosperity of human society. A recent IPCC report claims that human activities have caused ~1° C. increase in global warming, and that net zero global $CO_2$ emissions is needed to cap the warming below 1.5° C. in the next few decades to avoid catastrophic consequences. Even if drastic measures are taken to completely halt anthropogenic $CO_2$ emissions by 2040, negative effects of high atmospheric $CO_2$ concentration (415 ppm as of May 2019) will persist for decades afterwards due to the long lifetime of atmospheric $CO_2$ (thousands of years). Thus, it is not only imperative to reduce $CO_2$ emissions, but also to consider actively removing $CO_2$ from the atmosphere via Direct Air Capture ("DAC").

Temperature/humidity swing adsorption with liquid amines (e.g., mono-ethanolamine) is widely practiced in the natural gas industry and has been proposed for $CO_2$ removal from the flue gas of coal fired power plants. However, amines are less desirable adsorbents for DAC because of several features such as low stability to oxygen environments at elevated temperatures of $CO_2$ removal. Also, the capture rate of amines is low at low $CO_2$ feed concentrations.

Aqueous alkali hydroxides have also been proposed as absorbents in DAC processes very similar to the Kraft Caustic Recovery Cycle commonly used in the paper mill/pulp industry (FIG. 2). In these processes, dilute $CO_2$ in air is absorbed to form carbonate ions in an aqueous solution of an alkali hydroxide ($Na^+$ or $K^+$) via an acid-base reaction, followed by the introduction of calcium hydroxide to separate the carbonate in the form of solid calcium carbonate precipitate and regenerate the initial alkali hydroxide solution. The calcium carbonate is then calcined at high temperature (600-900° C.) to produce a $CO_2$ stream and calcium oxide ready for use in the subsequent cycle (after reacting with water to form calcium hydroxide), thus completing the cycle.

TABLE 1

Kraft Cycles (see FIG. 2)

| Step | Temperature (° C.) | Reaction |
| --- | --- | --- |
| 1 | 25 | 2 NaOH (aq)* + $CO_2$ (g) → $Na_2CO_3$ (aq)* + $H_2O$ |
| 7 | 25 | $Na_2CO_3$ (aq)* + $Ca(OH)_2$ (s) → 2 NaOH (aq)* + $CaCO_3$ (s) |
| 3 | 600-900 | $CaCO_3$ (s) → CaO (s) + $CO_2$ (g) |
| 4 | 100-300 | CaO (s) + $H_2O$ (g or 1) → $Ca(OH)_2$ |

*All sodium species may be substituted with potassium.

Two metal cations must be used in the cycle due to the different properties of the hydroxide and carbonate of $Na^+$ ($K^+$) and $Ca^{2+}$. The low solubility of $Ca(OH)_2$ in water makes it unsuitable as an absorbent, while the high thermal stability of $K_2CO_3$ and $Na_2CO_3$ makes their thermal decomposition energetically unfavorable. Despite recent research efforts, existing DAC processes have economics that could stand improvement (100-600 $/tonne $CO_2$). A comprehensive techno-economic analysis of current DAC technologies is available. See, e.g., M. Fashihi, et al., Techno-economic assessment of $CO_2$ direct air capture plants. *J. Cleaner Prod.* 224, 957-980 (2019).

Even if these types of technologies can be exploited, the captured carbon dioxide must either be stored or converted into other products. Thus, integrated technologies are needed to create carbon lifecycles that do not lead to downstream issues after the carbon dioxide is removed from the atmosphere.

One example of a successful integrated system is that of Carbon Recycling International (CRI) in Iceland (FIG. 3). The CRI process generates hydrogen from water electrolysis and reacts it with captured carbon dioxide to ultimately product methanol that is sold on the world market. Methanol can be used to produce a variety of chemicals and can also be converted into fuel via catalytic conversion technologies such as the Methanol-to-Gasoline process that for some time was commercialized in New Zealand.

At present, there are numerous projects throughout the world attempting to convert biomass into renewal fuels. Conceptually, the idea is to capture carbon dioxide from the atmosphere by plants, to then convert the plant biomass into fuel that then is used for combustion processes that return the carbon dioxide to the atmosphere. The efficiencies of converting carbon dioxide to biomass and then only a limited portion of the biomass to fuel question whether this cycle will ever be economically feasible. When considering this carbon cycle, the components that are recycled are carbon dioxide and water, and the energy used to drive the cycle comes from sunlight.

The present disclosure is directed to addressing some of the challenges of prior technologies in this field.

SUMMARY

The present disclosure is directed to a new cycle to extract carbon dioxide from air streams that is combined with hydrogen generation via thermochemical water splitting to generate hydrogen. The captured carbon dioxide and generated hydrogen can then be reacted in various ways to produce chemicals and fuels.

It has been shown that a thermochemical water splitting (TWS) cycle based on a Mn—Na—$CO_2$ and/or Fe—Na—$CO_2$ reaction networks is capable of splitting water into stoichiometric amounts of hydrogen and oxygen in three reaction steps; the highest temperature step operating upwards of 850-1000° C. (see B. Xu, Y. Bhawe and M. E. Davis, "Low-temperature, manganese oxide-based thermochemical water splitting cycle" *Proc. Natl. Acad. Sci. USA* 109 (2012) 9260-9264, B. Xu, Y. Bhawe and M. E. Davis, "Spinel Metal Oxide-Alkali Carbonate-Based, Low-Temperature Thermochemical Cycles for Water Splitting and Carbon Dioxide Reduction" *Chem. Mater.* 25 (2013) 1564-1571 and U.S. Pat. Nos. 8,940,269 and 9,206,042). All these references are incorporated by reference for all purposes. In contrast to sulfur-iodine TWS cycles, no toxic/corrosive chemicals are involved in the presently disclosed systems. The thermodynamic driving force of this TWS cycle is based on the divergent thermal and chemical stabilities of different manganese/iron oxide species (e.g., α-NaMnO$_2$ and MnO$_x$) at different temperatures and environments (See Table 2 and FIGS. 4A-B).

TABLE 2

Mn—Na—$CO_2$ Cycle, exemplary temperature conditions

| Step | Reaction | Temp (° C.) |
|---|---|---|
| 1 | 2 Mn$_3$O$_4$ + 3 Na$_2$CO$_3$ → 4 NaMnO$_2$ + 2 CO$_2$ + 2 MnO + Na$_2$CO$_3$ | 850 |
| 2 | Na$_2$CO$_3$ + 2 MnO + H$_2$O → 2 NaMnO$_2$ + CO$_2$ + H$_2$ | 850 |
| 3 | 6 NaMnO$_2$ + ay H$_2$O + (3 + b) CO$_2$ → Na$_2$CO$_3$ + a H$_x$MnO$_{2-y}$, H$_2$O + b MnCO$_3$ + c Mn$_3$O$_4$ | 80 |
| 4 | a H$_x$MnO$_{2-y}$, H$_2$O + b MnCO$_3$ → (2-c) Mn$_3$O$_4$ + ay H$_2$O + b CO$_2$ + 0.5 O$_2$ | 850 |
|  | Overall: H$_2$O → H$_2$ + 0.5 O$_2$ |  |

Note that while carbon dioxide is employed in this cycle, it is not consumed.

This disclosure exploits the properties of the transition metal oxide-based thermochemical cycle to extract carbon dioxide from air streams (atmospheric or otherwise, e.g., exhaust streams from processes that give off carbon dioxide), use it for the thermochemical cycle and then exhaust it in higher concentrations with the generated hydrogen to allow for further processing into chemicals and fuels. The heat necessary to drive the process can be obtained from solar or other heat sources, e.g., from nuclear reactors, steel production, etc. A schematic of one type of integration is illustrated in FIGS. 5A/5B. Note that the combination of carbon dioxide and hydrogen has already been shown to be processes into methanol (FIG. 3).

Certain aspects of the present disclosure include those embodiments comprising extracting carbon dioxide from an air stream (or other process streams) by contacting the air (or process) stream with a composition comprising an alkali metal ion-transition metal oxide of empirical formula A$_x$MO$_2$ (0.1<x≤1; or 0.1<x<1) to form a transition metal composition comprising an oxidized ion extracted-transition metal oxide, where A represents the alkali metal ion comprising sodium ion, potassium ion, or a combination thereof and M comprises iron, manganese, or a combination thereof. In preferred embodiments, M is manganese.

In certain embodiments, the alkali metal ion-transition metal oxide used to extract carbon dioxide from the air stream may be derived from compositions used in the water-splitting reactions comprising related chemistries. For example, in some embodiments, the alkali metal ion-transition metal oxide may be derived from contacting a composition comprising a spinel-type transition metal oxide of formula M$_3$O$_4$ with an alkali metal carbonate, bicarbonate, or mixture thereof in the presence of H$_2$O at a temperature in a range of from about 450° C. to about 1000° C. to form H$_2$, CO$_2$, and the alkali metal ion-transition metal oxide, wherein the alkali metal ion-transition metal oxide has an average transition metal oxidation state that is higher than the average oxidation state of the transition metal in the spinel-type transition metal oxide. At least a portion of alkali metal-ions may then be hydrolytically extracted from the alkali metal ion-transition metal oxide by the reaction with CO$_2$ and liquid H$_2$O at a second temperature in a range of from 60° C. to 250° C. as described herein to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion-transition metal oxide; and (c) thermochemically reducing the transition metal composition of step (b) at a third temperature in a range of from 450° C. to 1250° C., with the associated formation of O$_2$, wherein the transition metal, M, comprises iron, manganese, or a combination thereof, and the corresponding spinel-type transition metal oxide comprises Fe$_3$O$_4$, Mn$_3$O$_4$, or a solid solution or physical mixture thereof, and wherein the alkali metal ion comprises sodium ion, potassium ion, or a combination thereof. For example, see U.S. Pat. Nos. 8,940,269 and 9,206,042 for additional information.

One step of particular interest in the context of DAC in this cycle, where the transition metal oxides comprise oxides of manganese, is the extraction of Na$^+$ from MnO$_x$ layers of α-NaMnO$_2$ with CO$_2$ to form H$_x$MnO$_y$ and Na$_2$CO$_3$. α-NaMnO$_2$ slurries are quite alkaline in nature (pH=12-13), making them attractive as potential CO$_2$ adsorbents. There are two key parallels between the Mn—Na—CO$_2$ TWS and the Kraft cycles: (i) the use of CO$_2$ as an acid to extract alkali cations from an alkaline compound (α-NaMnO$_2$ and NaOH/

KOH, blue in both cycles in FIG. 4A), and (ii) high temperature production of $CO_2$ via thermal decomposition of carbonates ($Na_2CO_3$ and $CaCO_3$, green in FIG. 4A). These two parallels suggest that the Mn—Na—$CO_2$ TWS cycle has the potential to enable simultaneous DAC of $CO_2$ and hydrogen production.

In certain aspects, the contacting of the air stream with a composition comprising an alkali metal ion-transition metal oxide of empirical formula $A_xMO_2$ is done in the presence of water or steam. The water or steam may be added to the alkali metal ion-transition metal oxide before adding the carbon dioxide or at the same time as the carbon dioxide is added. In other aspects, the contacting is done at a temperature in a range of from about 60° C. to 250° C. Other subranges are set forth elsewhere herein.

In some aspects of these embodiments, the air stream is atmospheric air, optionally having a $CO_2$ content in a range of from 150 ppm to 500 ppm by weight, or another range set forth herein (in other industrial process streams, the $CO_2$ content may be higher, for example in ranges from 500 ppm to 1000 ppm). In other aspects, the air is provided to the alkali metal ion-transition metal oxide at a pressure near ambient pressure; e.g., within 10% of ambient (atmospheric) pressure.

In certain aspects of these embodiments, the atmospheric air is delivered to the alkali metal ion-transition metal oxide of empirical formula $A_xMO_2$ at ambient temperature. In other aspects, the atmospheric air is heated before contacting the alkali metal ion-transition metal oxide, for example to a temperature at or near the contacting temperature.

In some aspects of these embodiments, the air stream is delivered to the alkali metal ion-transition metal oxide using a solar updraft air tower.

In some aspects of these embodiments, the alkali metal ion-transition metal oxide has an empirical formula $A_xMO_2$, where x is in a range independently defined by a range where x is from 0.1 to 0.2, from 0.2 to 0.3, from 0.3 to 0.4, from 0.4 to 0.5, from 0.5 to 0.6, from 0.6 to 0.7, from 0.7 to 0.8, from 0.8 to 0.9, from 0.9 to 1.0, or any combination of two or more of these foregoing ranges.

Again, in further aspects of these embodiments, the alkali metal ion-transition metal oxide is generated in a second process of thermochemically forming $H_2$, $O_2$, or both $H_2$ and $O_2$, each independently/separately, from water, said second process comprising:

(a) contacting a composition comprising a spinel-type transition metal oxide of formula $M_3O_4$ with an alkali metal carbonate, bicarbonate, or mixture thereof in the presence of $H_2O$ at a first temperature in a range of from 450° C. to 1000° C. to form $H_2$ $CO_2$, and the alkali metal ion-transition metal oxide, said alkali metal ion-transition metal oxide having an average transition metal oxidation state that is higher than the average oxidation state of the transition metal in the spinel-type transition metal oxide;

(b) hydrolytically extracting at least a portion of alkali metal ions from the alkali metal ion-transition metal oxide by the reaction with $CO_2$, and liquid $H_2O$ at a second temperature in a range of from 60° C. to 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion-transition metal oxide; and (c) thermochemically reducing the transition metal composition of step (b) at a third temperature in a range of from 450° C. to 1150° C., with the associated formation of $O_2$:

wherein the transition metal, M, comprises iron, manganese, or a combination thereof, and the corresponding spinel-type transition metal oxide comprises $Fe_3O_4$, $Mn_3O_4$, or a solid solution or physical mixture thereof; and wherein the alkali metal ion comprises sodium ion, potassium ion, or a combination thereof.

In still further independent aspects of these embodiments, the $H_2$ and $CO_2$ generated by the second process is either captured, temporarily or permanently sequestered, or used either together or independently, or with other feedstocks for other purposes. Exemplary uses include capture and conversion to (a) syngas via the reverse water gas shift reaction or (b) to methanol by hydrogenation of the $CO_2$ or (c) to higher hydrocarbons by upgrading the $CO_2/H_2$ stream.

In still further aspects, energy for the processes set forth herein are derived, at least in part, from solar energy, preferably via solar concentrator, wind, wind, water or wave energy, internal combustion (e.g., coal, oil or other liquid fuels), or electric, or a combination thereof.

In this work, then, a methodology that integrates the DAC of $CO_2$ and the thermochemical water splitting that produces a mixture of $CO_2$ and $H_2$ (FIG. 4A) is exemplified. The $CO_2/H_2$ stream can be converted to a variety of fuels and chemical, e.g., to syngas via the reverse water gas shift reaction or methanol via any one of several established catalytic processes. Alternatively, the $CO_2/H_2$ stream can be directly upgraded to higher hydrocarbons via any one of several established processes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present application is further understood when read in conjunction with the appended drawings. For illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIG. 7A: Hydrogen Evolution; FIG. 7B: Sodium Extraction; and FIG. 7C: Thermal Reduction.

FIG. 10A: $CO_2$ in air breakthrough curves during DAC tests; FIG. 10B: The fraction of the $Na^+$ extracted during DAC of $CO_2$ while $CO_2$ concentrations are below 100 ppm

DETAILED DESCRIPTION OF ILLUSTRATIVE EMBODIMENTS

Figure 1:
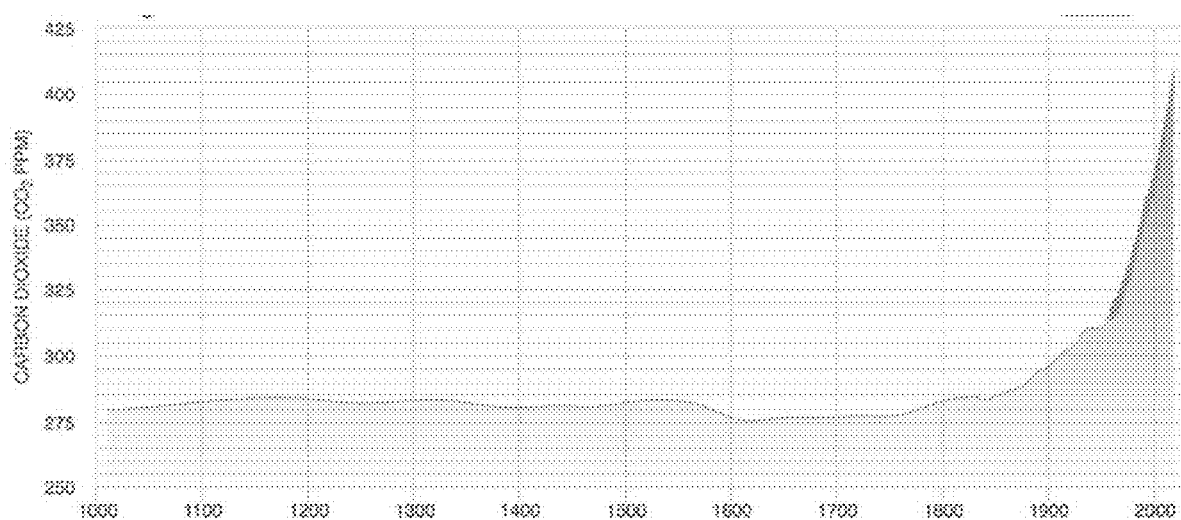
FIG. 1 illustrates global carbon dioxide levels over the past centuries.
Figure 2:
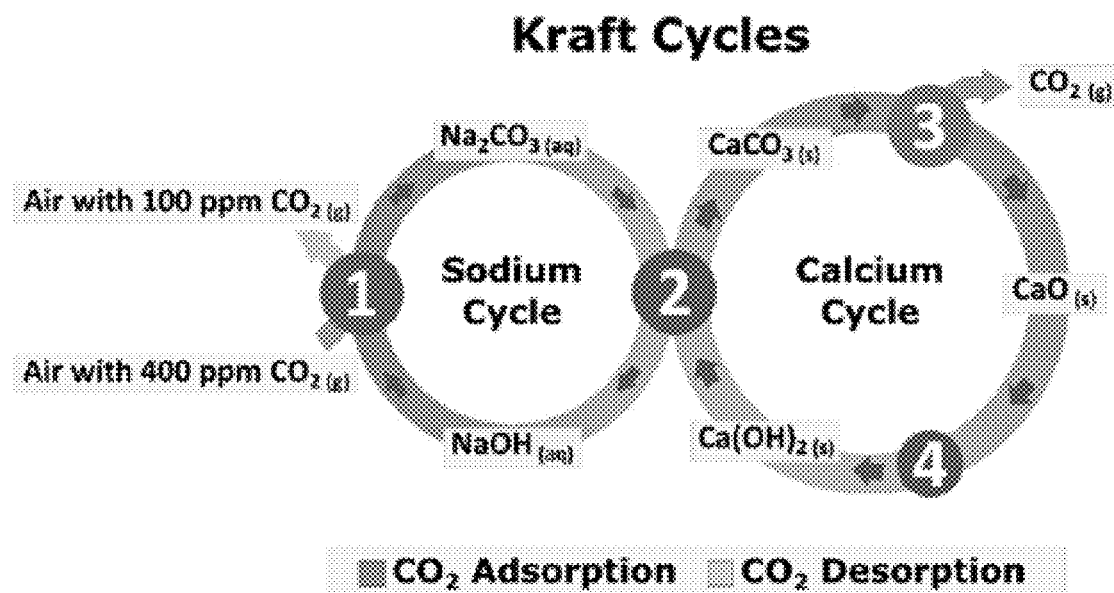
FIG. 2 schematically illustrates the Kraft Process based cycles present in literature. See also Table 1 and compare with FIG. 4 and Table 2.
Figure 3:
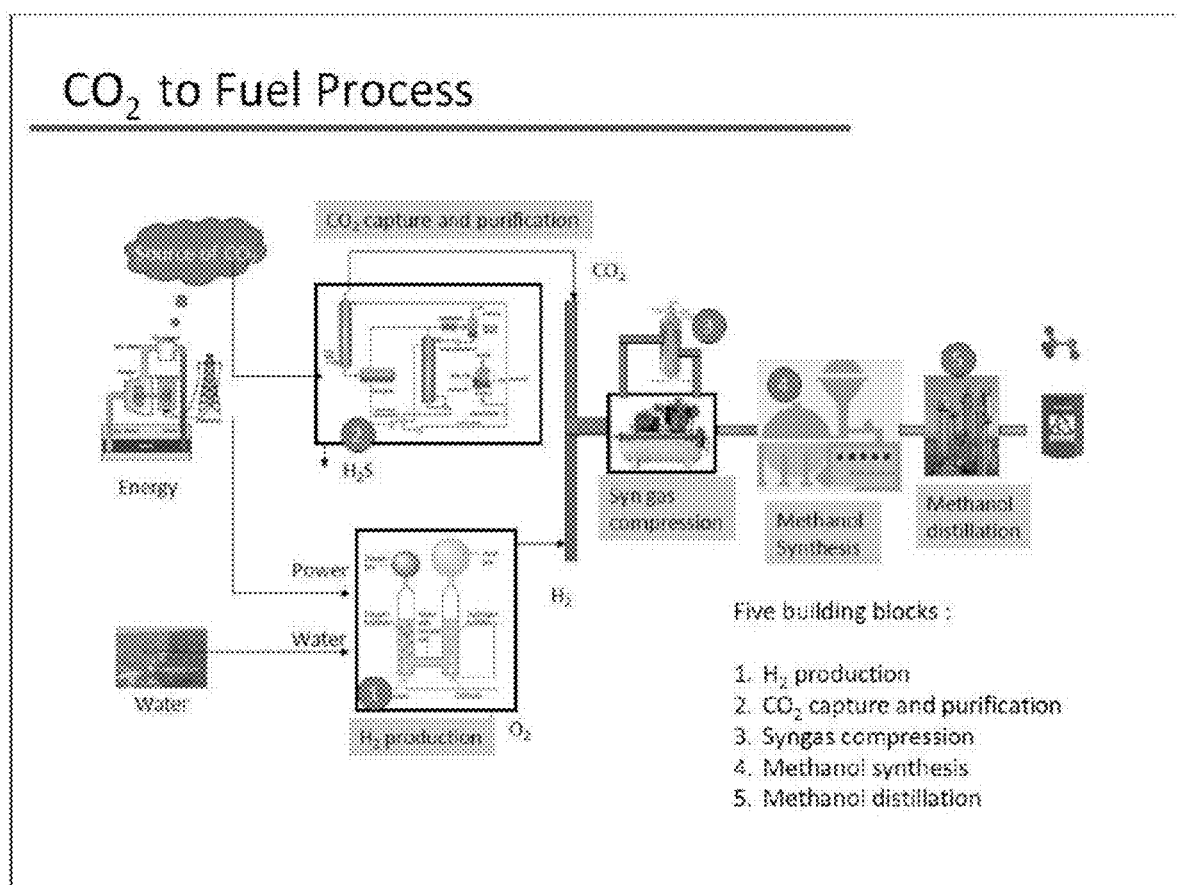
FIG. 3 schematically illustrates the CRI process of converting captured carbon dioxide into methanol.

The present disclosure is directed to the capture of carbon dioxide from ambient atmospheric air or air streams using an alkaline alkali metal ion-transition metal oxide of empirical formula $A_xMO_2$ ($0.1<x\leq1$ or $0.1<x<1$). This disclosure is additionally directed to an integrated process comprising the direct capture of carbon dioxide from air and thermochemical splitting of water.

Certain aspects of this disclosure, then, provides embodiments comprising processes comprising extracting carbon dioxide from an air stream by contacting the air stream with a composition comprising an alkali metal ion-transition metal oxide of empirical formula $A_xMO_2$ ($0.1<x\leq1$ or $0.1<x<1$) to form a transition metal composition (as set forth elsewhere herein) comprising an oxidized ion extracted-transition metal oxide, where A represents the alkali metal ion comprising sodium ion, potassium ion, or a combination thereof and M comprises iron, manganese, or a combination thereof.

Each permutation of the sodium ion, potassium ion, or a combination thereof and iron, manganese, or a combination thereof is considered an independent aspect of these embodiments. In preferred, non-exclusive embodiments, M is or comprises manganese. In other independent preferred, non-exclusive embodiments, A is or comprises sodium ion.

In certain independent aspects of these embodiments, the contacting is done in the presence of water or steam. The water or steam can be added to the alkali metal ion-transition metal oxide before adding the air stream containing the carbon dioxide. Alternatively, or additionally, the water or steam is added to the alkali metal ion-transition metal oxide at the same time as the air stream containing the carbon dioxide is added.

Alternatively, or additionally, the contacting is done at a temperature in a range of from about 60° C. to 250° C. Preferably the conditions allow for the presence of liquid water and the dissolution of the $CO_2$ therein. Additional or alternative embodiments include those where the temperature is defined by a range of from 60° C. to 70° C., 70° C. to 80° C., 80° C. to 90° C., 90° C. to 100° C., 100° C. to 110° C., 110° C. to 120° C., 120° C. to 130° C., 130° C. to 140° C., 140° C. to 150° C., 150° C. to 160° C., 160° C. to 170° C., 170° C. to 180° C., 180° C. to 190° C., 190° C. to 200° C., 200° C. to 210° C., 210° C. to 220° C., 220° C. to 230° C., 230° C. to 240° C., 240° C. to 250° C., and any combination of two or more of the foregoing ranges. The carbon dioxide and/or water can be at the same temperature or a different temperature as the alkali metal ion-transition metal oxide at the time of initial contact.

Without intending to be bound by any particular theory, it appears that the water intercalate between the metal oxide sheets of the alkali metal ion-transition metal oxide, expanding the distance between the adjacent layers, and improving the mobility of the alkali metal ions. The presence of the $CO_2$ in the water reacts to form carbonic acid whose protons replace the alkali metal ions, maintaining the oxidation state of the ion extracted-transition metal oxide. This may be accomplished at ambient atmospheric pressures below about 100° C., for examples in a temperature in a range of from about 60° C. to about 95° C., preferably about 80° C., by bubbling $CO_2$ into the water. It may also be accomplished at a temperature in a range of from about 100° C. to about 250° C., or even higher, provided the temperature is kept below the critical temperatures of water, and where the $CO_2$ is present at a partial pressure in a range of from about 1 bar to about 25 bar. The balance of temperature and pressure may be adjusted to provide for kinetic advantages. It has been shown that temperatures in a range of about 120° C. to about 160° C., with suitable $CO_2$ partial pressures, represent useful specific embodiments.

That is, the gas and water can be added to the alkali metal ion-transition metal oxide at temperatures independently outside these boundaries (e.g., at a lower or higher temperature). In other embodiments, one or both of the carbon dioxide and/or water is added to the alkali metal ion-transition metal oxide at a temperature within this range and the contacting maintained at one or more of the ranges set forth. In some embodiments, the atmospheric air provided to the alkali metal ion-transition metal oxide is delivered at ambient temperature. In other embodiments, the atmospheric air is heated before contacting the alkali metal ion-transition metal oxide.

Additionally, or alternatively, the air stream may delivered to the alkali metal ion-transition metal oxide using a solar updraft air tower. While any other means of providing such air feeds to a reactor comprising the alkali metal ion-transition metal oxide would also be appropriate, the solar updraft air tower provides the benefit to the economics of the processes.

Additionally, or alternatively, the air stream is atmospheric air, optionally having a $CO_2$ content in a range of from 150 ppm to 500 ppm by weight, from 150 ppm to 450, from 200 to 400 ppm, or from 300 ppm to 400 ppm by weight.

The efficiency of the alkali metal ion-transition metal oxide to scrub carbon dioxide from air feeds containing such low levels of carbon dioxide is considered unexpected.

Additionally, or alternatively, the alkali metal ion-transition metal oxide has an empirical formula $A_xMO_2$, where x is defined by a range of from 0.1 to 0.2, from 0.2 to 0.3, from 0.3 to 0.4, from 0.4 to 0.5, from 0.5 to 0.6, from 0.6 to 0.7, from 0.7 to 0.8, from 0.8 to 0.9, from 0.9 to 1.0, or any combination of two or more of these foregoing ranges. Those values of x that are 0.1, 0.2, 0.3, 0.4, 0.5, 0.6, 0.7, 0.8, 0.9, or 1, each ±0.05, are considered independent embodiments.

Additionally, or alternatively, some embodiments include those where the alkali metal ion-transition metal oxide is derived from the thermochemical water splitting reaction set forth elsewhere herein and may be compositionally defined in those terms, if different than set forth here. The alkali metal ion-transition metal oxide is alkaline, at least in the context of that derived from the thermochemical water splitting reaction set forth elsewhere herein.

Within this context, the alkali metal ion-transition metal oxide used to extract carbon dioxide from the air stream may be derived from compositions used in the water-splitting reactions comprising related chemistries—for example, wherein the alkali metal ion-transition metal oxide is generated in any process described in U.S. Pat. No. 8,940,269 or 9,296,042. In some embodiments, the alkali metal ion-transition metal oxide may be derived from contacting a composition comprising a spinel-type transition metal oxide of formula $M_3O_4$ with an alkali metal carbonate, bicarbonate, or mixture thereof in the presence of $H_2O$ at a temperature in a range of from about 450° C. to about 1000° C. to form $H_2$, $CO_2$, and the alkali metal ion-transition metal oxide, wherein the alkali metal ion-transition metal oxide has an average transition metal oxidation state that is higher than the average oxidation state of the transition metal in the spinel-type transition metal oxide. At least a portion of alkali metal-ions may then be hydrolytically extracted from the alkali metal ion-transition metal oxide by the reaction with $CO_2$ and liquid $H_2O$ at a second temperature in a range of from 60° C. to 250° C. as described herein to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion-transition metal oxide; and (c) thermochemically reducing the transition metal composition of step (b) at a third temperature in a range of from 450° C. to 1250° C., with the associated formation of $O_2$, wherein the transition metal, M, comprises iron, manganese, or a combination thereof, and the corresponding spinel-type transition metal oxide comprises $Fe_3O_4$, $Mn_3O_4$, or a solid solution or physical mixture thereof, and wherein the alkali metal ion comprises sodium ion, potassium ion, or a combination thereof.

In preferred of these embodiments, the spinel-type transition metal oxide of formula $M_3O_4$ is $Mn_3O_4$. Independently, in other preferred embodiments, the alkali metal carbonate, bicarbonate, or mixture thereof is or comprises sodium carbonate. Independently, in other preferred embodiments, the $Mn_3O_4$ and sodium carbonate is contacted in the presence of $H_2O$ at a temperature in a range of from about 550° C. to about 900° C., more preferably about 850° C., to form $H_2$, $CO_2$, and a sodium birnessite-type $AMnO_2$ ($0<x\leq1$ or $0<x<1$), preferably derived from α-$NaMnO_2$, the sodium birnessite-type manganese dioxide having an average transition metal oxidation state that is higher than the average oxidation state of the transition metal in the spinel-type $Mn_3O_4$. A portion of sodium cations may then be hydrolytically extracted from the sodium birnessite-type manganese dioxide by the reaction with the $CO_2$ and liquid $H_2O$ at a second temperature in a range of from about 70° C. to about 90° C. at ambient or near ambient pressure to form a transition metal composition comprising an protonic birnessite in which the average oxidation state of the transition metal in the protonic birnessite is the same as the average oxidation state of the transition metal in the sodium birnessite-type manganese oxide. This composition comprising the protonic birnessite may then be thermochemically reduced at a third temperature, preferably in a range of from about 550° C. to about 900° C., more preferably about 850° C., with the associated formation of $O_2$.

In some embodiments, the spinel-type transition metal oxide of formula $M_3O_4$ is $Fe_3O_4$. Independently, in other embodiments, the alkali metal carbonate, bicarbonate, or mixture thereof is or comprises sodium carbonate or potassium carbonate, or a mixture thereof. Independently, in other preferred embodiments, the $Fe_3O_4$ and sodium and/or potassium carbonate is contacted in the presence of $H_2O$ at a temperature in a range of from about 550° C. to about 900° C., preferably about 850° C., to form $H_2$, $CO_2$, and a sodium- or potassium-type $A_xFeCO_2$ ($0<x\leq1$ or $0<x<1$), preferably $NaFeO_2$ or $KFeO_2$), the sodium- or potassium-type iron dioxide having an average transition metal oxidation state that is higher than the average oxidation state of the transition metal in the spinel-type $Fe_3O_4$. A portion of sodium or potassium cations from the sodium- or potassium-type iron dioxide may then be hydrolytically extracted by the reaction with $CO_2$ and liquid $H_2O$ at a second temperature in a range of from about 70° C. to about 90° C. at an ambient or near ambient pressure to form a transition metal composition comprising $Fe_3O_4$ or a hydrated form thereof, in which the average oxidation state of the transition metal is the same as the average oxidation state of the transition metal in the $Fe_2O_3$, or a hydrated form thereof. This transition metal composition may then be thermochemically reduced at a third temperature in a range of from about 1150° C. to about 1250° C., with the associated formation of $O_2$.

Each of the steps set forth above is considered an individual embodiment, as are any combination of those steps. Further, any reference to $H_2O$ should be interpreted as including isotopes of $H_2O$, including $D_2O$.

The net reaction of these embodiments comprises the capture of $CO_2$ and the stoichiometric splitting of water to hydrogen and oxygen, accompanied by changes in the overall net oxidation step of the metals. As used herein, the term "spinel-type transition metal oxide" is well understood by those skilled in the relevant art as describing a particular crystal lattice configuration of metal oxides, having an overall empirical formula $M_3O_4$. As used herein, particularly with respect to Co, Fe, and Mn, while each individual metal center may have a nominal integral value (e.g., +2 and +3), the overall net oxidation state of the average metal center is 2⅔.

Alternatively, or additionally, the processes described in terms of the capture of $CO_2$ may employ the same alkali metal ion-transition metal oxide as generated in a second process of thermochemically forming $H_2$, $O_2$, or both $H_2$ and $O_2$, each independently/separately, from water, said second process comprising:

(a) contacting a composition comprising a spinel-type transition metal oxide of formula $M_3O_4$ with an alkali metal carbonate, bicarbonate, or mixture thereof in the presence of $H_2O$ at a temperature in a range of from 450° C. to 1000° C. to form $H_2$ $CO_2$, and the alkali metal ion-transition metal oxide, said alkali metal ion-transition metal oxide having an average transition metal oxidation state that is higher than the average oxidation state of the transition metal in the spinel-type transition metal oxide;

(b) hydrolytically extracting at least a portion of alkali metal ions from the alkali metal ion-transition metal oxide by the reaction with $CO_2$, and liquid $H_2O$ at a second temperature in a range of from 60° C. to 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion-transition metal oxide; and (c) thermochemically reducing the transition metal composition of step (b) at a third temperature in a range of from 450° C. to 1150° C., with the associated formation of $O_2$:

wherein the transition metal, M, comprises iron, manganese, or a combination thereof, and the corresponding spinel-type transition metal oxide comprises $Fe_3O_4$, $Mn_3O_4$, or a solid solution or physical mixture thereof; and wherein the alkali metal ion comprises sodium ion, potassium ion, or a combination thereof.

While these second processes described provide a context in which the captured carbon dioxide is released after capture, it should be appreciated that they do not necessarily rely on the release mechanism set forth in these second processes.

In some embodiments, the $H_2$ and $CO_2$ generated by the second process is captured. The generated $O_2$ may be used or released. The captured gases may be temporarily or permanently sequestered, or may be used either together or independently, or with other feedstocks for other purposes. For example, in some cases, the generated $H_2$, and $CO_2$ generated by the second process is captured and converted to (a) syngas via the reverse water gas shift reaction or (b) to methanol by hydrogenation of the $CO_2$ or (c) to higher hydrocarbons by upgrading the $CO_2/H_2$ stream. The technologies for such conversions are well understood by those skilled in the art and need not be set forth here.

The overall energy for any of the processes set forth herein can be conveniently derived from a number of sources, for example solar energy, preferably via solar concentrator, wind, wind, water or wave energy, internal combustion (e.g., coal, oil or other liquid fuels), or electric, or a combination thereof. Renewable energy, such as solar, wind, water, or wave energy are preferred, solar energy being more preferred economically. In some embodiments, some or all the energy for the process or second process may be derived from solar energy, either directly (e.g., solar concentrators) or indirectly (solar cells forming electricity).

The processes can be operated one or more times a day or continuously. The reader is referred to FIGS. 6 A-D for exemplary, non-limiting configurations and equipment, including, for example a diurnal cycle in the operation of the process.

In certain aspects of the preceding embodiments, wherein the contacting the composition comprising a spinel-type transition metal oxide of formula $M_3O_4$ with an alkali metal carbonate, bicarbonate, or mixture thereof is done stepwise first in the absence and then in the presence of $H_2O$.

Additionally, or alternatively, the carbonate, bicarbonate, or mixture thereof comprises a carbonate. The carbonate, bicarbonate, or mixture thereof may comprise a carbonate of sodium or potassium. Sodium carbonate may be preferred in the case of a manganese system, while sodium or potassium carbonates may be suitable for use with iron systems. In such cases, the corresponding alkali metal ion-transition metal oxide can comprise a composition having an empirical formula $AMO_2$, where A represents the alkali metal ion.

Additionally, or alternatively, at least within these latter contexts, the alkali metal ion-transition metal oxide comprises a composition having an empirical formula $AMO_2$, where A represents the alkali metal ion. $AMO_2$ is preferably $NaMnO_2$.

Additionally, or alternatively, at least within these latter contexts, at least one of the first (associated with contacting $M_3O_4$ with an alkali metal carbonate, bicarbonate, or mixture thereof in the presence of $H_2O$) and third (associated with thermochemically reducing the transition metal composition) temperatures is in a range of from 750° C. to 850° C. In some of these embodiments, the third temperature is in a range of from 550° C. to 1150° C.

Additionally, or alternatively, at least within these latter contexts, the second temperature (associated with hydrolytically extracting the alkali metal ions from the alkali metal ion-transition metal oxide by the reaction with $CO_2$, and $H_2O$) is in a range of from about 60° C. to about 95° C., at ambient atmospheric pressure.

In preferred embodiments, wherein the transition metal comprises manganese. Additionally, or alternatively, the carbonate, bicarbonate, or mixture thereof comprises a carbonate; and the alkali metal ion comprises sodium ion. Additionally, or alternatively, the alkali metal ion-stabilized oxidized-transition metal oxide comprises a composition having an empirical formula of $NaMnO_2$, optionally formed by at least one reaction resulting from contacting sodium carbonate and $Mn_3O_4$. Additionally, or alternatively, the alkali metal ion-stabilized oxidized-transition metal oxide is or comprises $\alpha$-$NaMnO_2$. Such a composition may be derived from contacting sodium carbonate and $Mn_3O_4$ is according to the stoichiometries:

$$Na_2CO_3 + Mn_3O_4 \rightarrow 2NaMnO_2 + CO_2 + MnO; \text{ and} \quad (i)$$

$$2MnO + Na_2CO_3 + H_2O \rightarrow H_2 + CO_2 + 2NaMnO_2. \quad (ii)$$

Additionally, or alternatively, and as discussed elsewhere herein, the hydrogen generation reactions may be conducted in the presence of water, or in the sequential absence and presence of water. For example, the $Mn_3O_4$ may react with $Na_2CO_3$ in the absence of water, forming $NaMnO_2$ and MnO; in which the Mn(III) species is extracted from $Mn_3O_4$ through the reaction with $Na_2CO_3$, leaving the Mn(II) species in the form of MnO:

$$Mn_3O_4(s) + Na_2CO_3(s) \rightarrow 2NaMnO_2(s) + MnO(s) + CO_2(g)$$

followed by the oxidation of Mn(II) oxide by water in the presence of $Na_2CO_3$, producing hydrogen and $NaMnO_2$:

$$2MnO(s) + Na_2CO_3(s) + H_2O(g) \rightarrow H_2(g) + CO_2(g) + 2NaMnO_2(s)$$

Generally, under these conditions, the $NaMnO_2$ is in the form of $\alpha$-$NaMnO_2$.

Additionally, or alternatively, in other embodiments, the individual reaction steps may be described independently in terms of the stoichiometries laid out in Table 2.

In some embodiments, the transition metal comprises iron. Additionally, or alternatively in this context, the carbonate, bicarbonate, or mixture thereof comprises a carbonate. Additionally, or alternatively in this context, the alkali metal ion comprises sodium ion, potassium ion, or a combination thereof. Additionally, or alternatively in this context, the alkali metal ion-transition metal oxide is $NaFeO_2$ or $KFeO_2$, optionally formed by a reaction between $Fe_3O_4$ and sodium carbonate or between $Fe_3O_4$ and potassium carbonate, respectively.

The several embodiments of the inventive methods have thus far been described as comprising steps involving several separate temperatures. These temperatures are intended to reflect both static hold temperatures and transitional temperatures. For those embodiments where static hold temperatures are employed, such temperatures also include temperature profiles having ramped heat-up and cool-down conditions. Non-limiting exemplars of such temperature profiles are described in the Examples. In certain embodiments, the first and third temperatures are both higher than the second temperature and may be nominally the same or different. In independent embodiments, the temperatures associated with contacting $M_3O_4$ with an alkali metal carbonate, bicarbonate, or mixture thereof in the presence of $H_2O$ and associated with thermochemically reducing the transition metal composition are independently in a range bounded at the lower end by a temperature of about 450° C., about 500° C., about 550° C., about 600° C., about 650° C., about 700° C., or about 750° C., and at upper end by a temperature of about 1250° C., about 1200° C., about 1150° C., about 1100° C., about 1050° C., about 1000° C., about 950° C., about 900° C., or about 850° C. Specific non-limiting exemplary ranges include a range of from about 750° C. to about 850° C. for the first temperature and a range of from about 550° C. to about 850° C. (for a manganese system) or about from about 550° C. to about 1120° C. (for an iron system) for the third temperature. In some embodiments with a manganese system, both first and third temperatures are about 850° C. In some embodiments with an iron system, the first temperature is about 850° C. and the third temperature is about 1150° C.

Figure 4A:
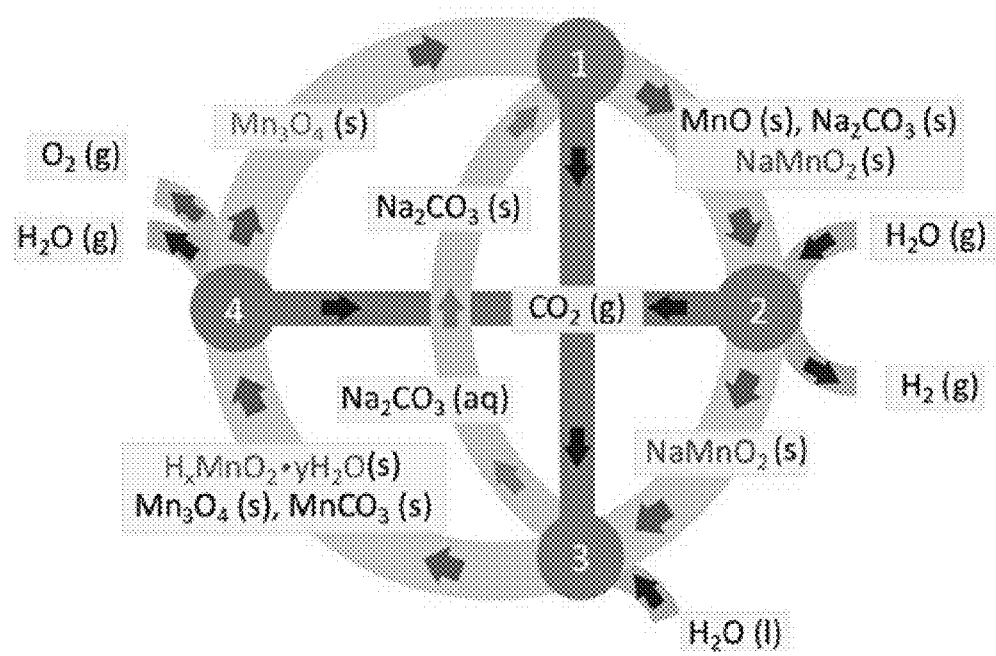
FIG. 4A schematically illustrates the transition metal oxide-based thermochemical water splitting cycle as set forth herein.
Figure 4B:
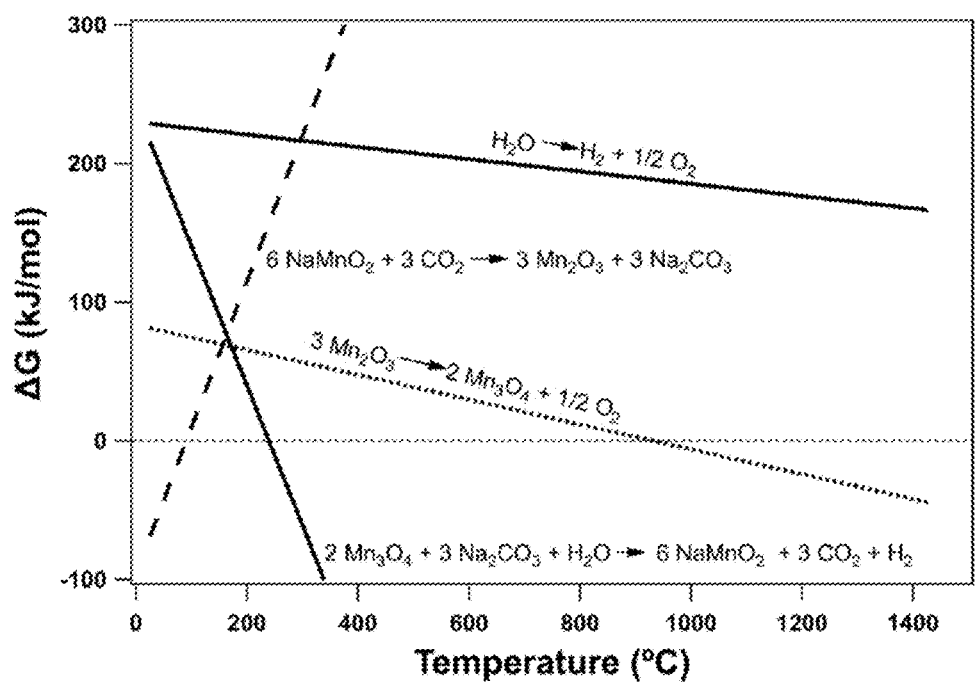
FIG. 4B illustrates the temperature dependent Gibbs free energy changes of the major reactions of the Mn—Na—$CO_2$ TWS cycle FIG. 5A schematically illustrates an integrated process of carbon dioxide capture and thermochemical water splitting (TWS).
Figure 5A:
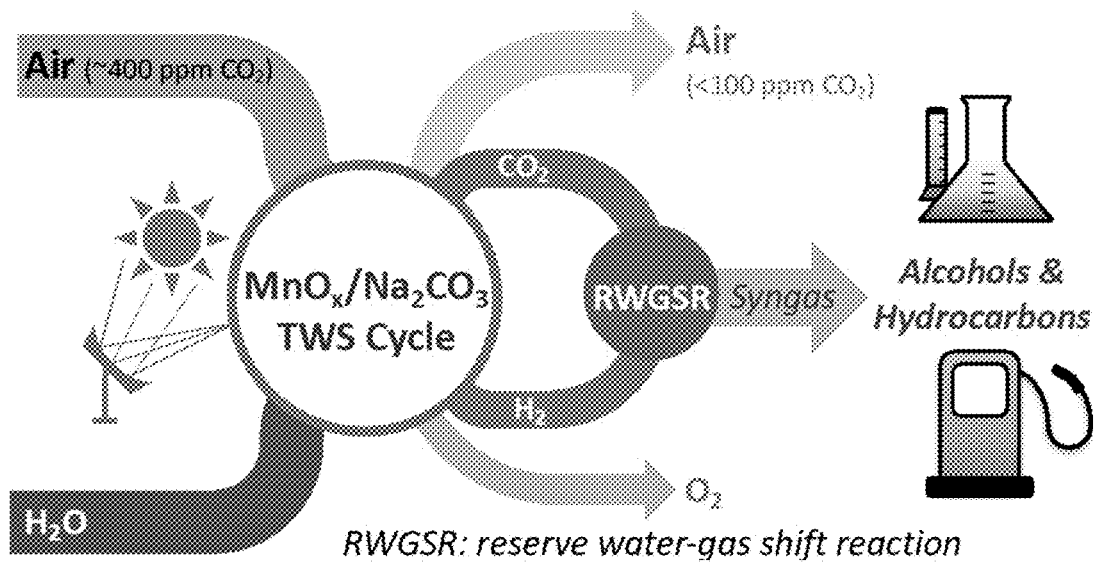
FIG. 5B schematically illustrates an integrated process Direct Air Capture (DAC) of $CO_2$ and thermochemical water splitting. number of established catalytic processes (20). Alternatively, the $CO_2/H_2$ stream can be directly upgraded to higher hydrocarbons via any one of a number of established processes.
Figure 5B:
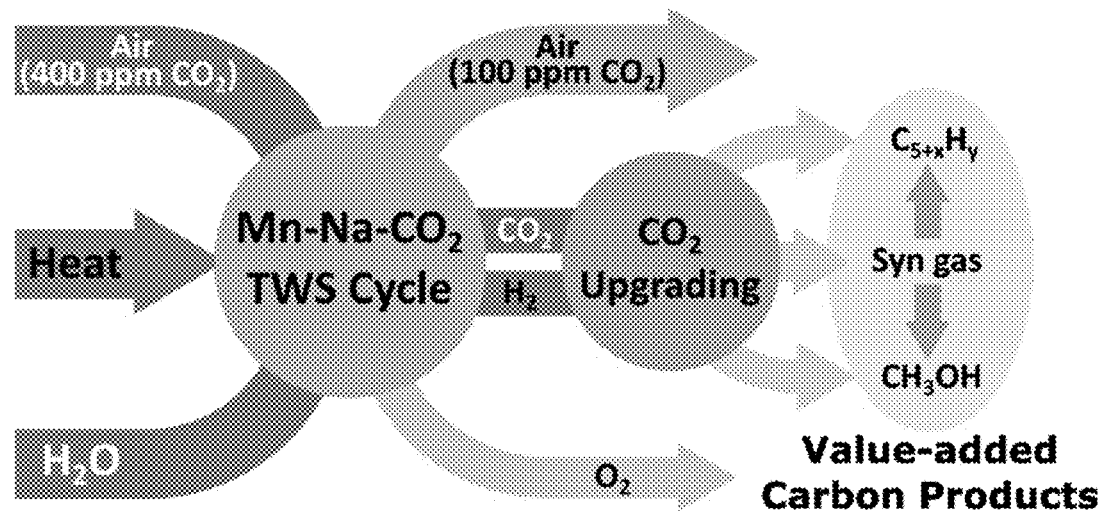

Certain specific embodiments provide for disclosed methods include those generally shown in FIGS. 4A-B. In the case of one exemplary, non-limiting manganese system, the thermochemical cycle can be envisioned as overall consisting of, consisting essentially of, or comprising four main steps:

(i) thermal treatment of a physical mixture of $Na_2CO_3$ and the spinel $Mn_3O_4$ to produce MnO, $CO_2$, and the layered compound, $\alpha$-$NaMnO_2$ at about 850° C.;

(ii) oxidation of MnO in the presence of $Na_2CO_3$ by water to produce $H_2$, $CO_2$, and $\alpha$-$NaMnO_2$ at about 850° C.;

(iii) $Na^+$ extraction from $\alpha$-$NaMnO_2$ by suspension in aqueous solutions in the presence of bubbling $CO_2$ at about 80° C.; and (iv) recovery of $Mn_3O_4$ by thermally reducing the sodium ion extracted solid produced in step (iii) at about 850° C. Other variations on this theme, including combining steps and using different temperatures, extraction methods, and metal oxides are also available, as described below. The net reaction is the sequestering of $CO_2$ for later use or storage and the stoichiometric splitting of water to hydrogen and oxygen without any by-product. Without being bound by the correctness of any particular theory, it appears that the incorporation and extraction of $Na^+$ into and out of the manganese oxides are important steps in lowering the temperature required for the overall process.

For these manganese systems, certain embodiments provide that the "cation extraction step" is described in the following terms: the Mn(III) species in $\alpha$-$NaMnO_2$ cannot be thermally reduced below 1000° C., whereas thermal reduction of a portion of Mn(III) in $Mn_2O_3$ to form $Mn_3O_4$ occurred below 850° C. Therefore, the sodium cations are suitably removed from the manganese oxide in order to close the thermochemical cycle below 1000° C. The sodium cations in $\alpha$-$NaMnO_2$ may be substituted with protons by suspending the $\alpha$-$NaMnO_2$ in water in the presence of $CO_2$. As discussed above, this may be suitably done below or above 100° C., provided liquid water is present and $CO_2$ is dissolved therein. Without being bound by any particular theory, it appears that water molecules intercalate into the manganese oxide layers, increasing the distance between the layers and mobilizing sodium cations. Protons from carbonic acid, formed via the reaction of $CO_2$ and water, can exchange with the sodium cations between manganese oxide layers. When $CO_2$, and in turn protons, are in excess, almost all sodium cations can be removed from the manganese oxide structure. A disproportionation reaction may accompany the ion exchange process:

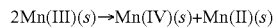
$2Mn(III)(s) \rightarrow Mn(IV)(s) + Mn(II)(s)$

All Mn(IV) and the majority of Mn(III) species may be provided in a proton exchanged birnessite phase. A fraction of the Mn(II) and the remainder of the Mn(III) may be present in an amorphous $Mn_3O_4$ phase, while the rest of Mn(II) species exists in the form of $MnCO_3$. Since no net oxidation or reduction reaction occurs during the ion exchange process, the average oxidation state of the Mn remains +3.

Accordingly, in certain embodiments, the alkali metal ion transition metal oxide comprises a composition having a nominal stoichiometry of $NaMnO_2$ and the extraction of the $Na^+$ from the $NaMnO_2$ is characterized by a stoichiometry:

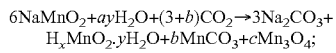
$6NaMnO_2 + ayH_2O + (3+b)CO_2 \rightarrow 3Na_2CO_3 +$
$H_xMnO_2 \cdot yH_2O + bMnCO_3 + cMn_3O_4;$ wherein $a+b+3c=6$ and $(4-x) \cdot a + 2b + 8c = 18$.

(see Table 2). In specific embodiments, the transition metal composition of $H_xMnO_2 \cdot yH_2O$ comprises a protonic birnessite, and the composition may be conveniently thermochemically reduced as set forth elsewhere herein. In this case, next step of the method may be characterized by a stoichiometry:

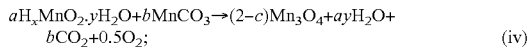
$aH_xMnO_2 \cdot yH_2O + bMnCO_3 \rightarrow (2-c)Mn_3O_4 + ayH_2O +$
$bCO_2 + 0.5O_2;$ (iv)

wherein $a+b+3c=6$ and $(4-x) \cdot a + 2b + 8c = 18$.

(see Table 2). That is, the solid mixture collected after the sodium cation extraction may be heated to a temperature in a range of from about 750° C. to about 850° C., preferably about 850° C., under inert atmosphere (e.g., Ar or $N_2$). Note that higher temperatures may also be employed (e.g., upwards of 1250° C.), but the lower temperatures are preferred. Under these conditions, the thermochemical reduction restores the manganese oxides to the spinel-type $Mn_3O_4$ phase (with the release of $CO_2$ and $O_2$ in the process), that can be used in the next cycle.

The methods may also use iron oxides, and certain embodiments provide that such methods include the use of spinel type $Fe_3O_4$; the carbonate, bicarbonate, or mixture thereof comprises a carbonate; and the alkali metal ion comprises sodium ion, potassium ion, or a combination thereof. In some of these embodiments, the alkali metal ion-transition metal oxide is $NaFeO_2$ or $KFeO_2$, formed by the reactions between $Fe_3O_4$ and sodium carbonate and between $Fe_3O_4$ and potassium carbonate, respectively. Similarly, still other embodiments include those where the alkali metal ion is $Na^+$ or $K^+$ or a combination thereof, and the alkali metal ion-transition metal oxide comprises a composition having a stoichiometry of $NaFeO_2$ or $KFeO_2$.

Other specific embodiments also provide methods of thermochemically forming $H_2$, $O_2$, or a combination thereof from water, under catalytic conditions, each method comprising: (a) contacting a composition comprising a spinel-type $Fe_3O_4$ with sodium or potassium carbonate, or a mixture thereof, in the presence of $H_2O$ at a first temperature in a range of from about 550° C. to about 900° C., preferably about 850° C., to form $H_2$, $CO_2$, and a sodium- or potassium-type $A_xFeO_2$ (0<x<1), preferably $NaFeO_2$ or $KFeO_2$, the sodium- or potassium-type iron dioxide having an average transition metal oxidation state that is higher than the average oxidation state of the transition metal in the spinel-type $Fe_3O_4$; (b) hydrolytically extracting at least a portion of sodium cations from the sodium- or potassium-type iron dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising $Fe_2O_3$ or a hydrated form thereof, in which the average oxidation state of the transition metal is the same as the average oxidation state of the transition metal in the $Fe_2O_3$ or a hydrated form thereof, and (c) thermochemically reducing the transition metal composition of step (b) at a third temperature in a range of from about 1150° C. to about 1250° C., with the associated formation of $O_2$.

Each of the catalytic systems is robust over repetitive cycles. Accordingly, independent embodiments of the present invention include those where steps (a) then (b) then (c) of the methods described herein are performed in order at least 5 times, at least 10 times, at least 50 times, or at least 100 times, with less than 10%, less than 5%, or practically no loss of activity, relative to their initial activities.

System Design Considerations

While the chemistry of all of the steps in the disclosed cycle have been demonstrated with the Mn—Na—$CO_2$, several major challenges remain in coupling the cycle with a solar thermal power source and the DAC of $CO_2$ (note: while the following descriptions are presented in terms of the Na/Mn systems, they should be viewed in the terms of the more general teachings herein). These challenges include that (a) solar energy is inherently intermittent, restricting the amount of time high temperature reactions can be performed, and (b) DAC of $CO_2$ requires the utilization of massive air flow. Herein, the inventors set forth a solution to these issues (exemplary configurations summarized in FIGS. 6B-D). Heat for the cycle can be supplied by a solar collector field that provides superheating steam to 1000° C. Concentrated solar thermal power is useful for generating high quality heat for water splitting cycles. However, the diurnal cycle of available solar energy restricts the amount of time a water splitting reactor can be held at high temperatures on a daily basis. Conveniently, the combined water splitting and $CO_2$ DAC process has two distinct operating regimes that pair well with this diurnal constraint. While high-quality heat is required for the high temperature steps; sodium extraction is exothermic and time consuming if dilute atmospheric $CO_2$ is used as a $CO_2$ source. Thus, cyclic quasi-batch (e.g., FIG. 6D shows but one potential schedule of operation) operation where the high temperature steps are performed during the day and $Na^+$ extraction is performed at night enables effective utilization of reactor time despite the limitations imposed by a diurnal power source. $CO_2$ DAC requires large flowrates of air due to the low concentration (~400 ppm) of $CO_2$. This leads to a correspondingly large power requirement. This issue can be addressed by using a solar updraft tower. These systems can be used for generating power from solar heating via thermal updraft through a power generating turbine suspended in a large tower surrounded on ground level by a large solar collection basin (left in FIG. 6C). While this technology usually shows low efficiency in producing electricity, it is an excellent source of high flowrates of air without the corresponding electricity costs. In addition, the added flexibility of producing electricity when $CO_2$ DAC is not taking place (during the day). It is important to note that this diurnal quasi-batch operating schedule is only one possible implementation of this concept. With the implementation of a high temperature heat storage system and/or a system for the recirculation of solids the cycle could be executed with higher frequencies or even continuously.

The integration of these two passive solar technologies, ideally with, but not limited to, the Mn—Na—$CO_2$ water splitting cycle yield a process ideal for coupling DAC of $CO_2$ and water splitting. High temperature steps that produce hydrogen and oxygen operate during the daytime when concentrated solar energy is available with steam as a heating medium (top right of FIG. 6B). The heat exchange/separation system (bottom right of FIG. 6B) receives either dilute streams of $H_2$ and $CO_2$ in steam or $O_2$ in steam from the TWS reactor. This gas stream is first cooled to ~600° C. in a heat exchanger that provides heat to dry $Na_2CO_3$ solutions produced during sodium extraction. This 600° C. stream is then introduced to a steam turbine that cools the stream further to 100° C. and produces electricity. A water knockout vessel is used to condense the majority of the steam and separate the final gas mixture ($H_2$ and $CO_2$ or $O_2$). The condensed water can then be reused as a source of steam such that each cycle consumes only the stoichiometric amount of water for water splitting. The use of steam as a reactant, heat transfer medium and carrier gas significantly simplifies the process as compared to other water splitting cycles that require inert carrier gases and makes leveraging waste heat (via steam turbine) possible. At night, liquid water is supplied to the water splitting reactor and a constant flow of air from the solar updraft tower (heat captured during the day by the solar tower allows operation at night; 24-hour operation of solar towers is already proven in other applications) is introduced in order to extract sodium from α-$NaMnO_2$ via $CO_2$ absorption. At the end of the night the resulting $Na_2CO_3$ slurry is removed and dried during the day using excess heat from the TWS reactor effluent. The dried solid is then reintroduced to the TWS reactor between thermal reduction and $H_2$ evolution via solid-gas fluidization. This design yields a process that requires only water, air and sunlight to produce a stream of concentrated $CO_2$ and $H_2$ for further upgrading, a stream of pure oxygen, and electricity.

Terms

The present invention may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements or use of a "negative' limitation. Finally, while an embodiment may be described as part of a series of steps or part of a more general structure, each said step may also be considered an independent embodiment in itself, combinable with others.

The transitional terms "comprising," "consisting essentially of," and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of." For those embodiments provided in terms of "consisting essentially of," the basic and novel characteristic(s) is the facile operability of the methods (or the systems used in such methods).

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

Throughout this specification, words are to be afforded their normal meaning, as would be understood by those skilled in the relevant art. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are described herein.

As used herein, the term "alkali metal ion-transition metal oxide" refers to the compound or composition in which at least a portion of the compound or composition of comprises stoichiometric or sub-stoichiometric amount of lattice alkali metal ions. Examples of this include compositions having a nominal formulae $A_xMO_2$ ($0.1 < x \leq 1$ or $0 < x < 1$), where A is an alkali metal ion and M is the transitional metal ion corresponding to a spinel-type transition metal oxide (see elsewhere herein), and preferably where x is higher than about 0.5, about 0.6, about 0.7, about 0.8, or about 0.9, or is nominally about 1. $NaFeO_2$, $KFeO_2$, and $\alpha$-$NaMnO_2$ are examples of such structures. Such compositions typically comprise layered structures in which the alkali metal ions are positioned between octahedrally coordinated metal oxide layers. Importantly, the mean oxidation of the transition metal centers in such compositions are higher than the average oxidation state of a corresponding spinel metal oxide; that is, the action of the alkali metal carbonate or bicarbonate allows for oxidizing the metal in the spinel metal oxide while reducing water to form hydrogen. In the case of $NaFeO_2$, $KFeO_2$, and $\alpha$-$NaMnO_2$, for example, the nominal oxidation state of the Fe or Mn is +3. The "portion" of alkali metal ions, in this situation, is sufficient to stabilize the higher oxidation state. Unless otherwise specified, "at least a portion" refers to at least 50% of the metal oxide composition or compound contains alkali metal ion as $AMO_2$, though additional specific individual embodiments include those where at least about 50%, at least about 60%, at least about 70%, at least about 80%, at least about 90%, at least about 95%, or substantially all of the metal oxide composition or compound contains alkali metal ion as $AMO_2$.

The terms "transition metal composition comprising an oxidized ion extracted-transition metal oxide" or simply "oxidized ion extracted-transition metal oxide" refer to a transition metal oxide that has a mean metal center oxidation state that is higher than the corresponding spinel transition metal oxide, preferably and/or typically the same or similar to the average oxidation state of that in the alkali metal ion-transition metal oxide, and which has a level of intercalated alkali metal ion which, if any, is depleted relative to the amount of the alkali metal ion in the corresponding alkali metal ion-transition metal oxide. Preferably, the mean oxidation states of the metals of the alkali metal ion-transition metal oxide and the oxidized ion extracted-transition metal oxide are the same and the amount of alkali metal ions within the oxidized ion extracted-transition metal oxide is substantially or practically zero. Practical realities of extraction kinetics or structure may compromise this preferred condition.

In certain embodiments of the methods, the step (a) of contacting the composition comprising a spinel-type transition metal oxide of formula $M_3O_4$ with an alkali metal carbonate, bicarbonate, or mixture thereof is done stepwise first in the absence and then in the presence of $H_2O$. In other embodiments, the contacting of the spinel-type transition metal oxide of formula $M_3O_4$ with an alkali metal carbonate, bicarbonate, or mixture thereof is done in entirely in the presence of water. In still other embodiments, including those where the spinel transition metal oxide is $Fe_3O_4$, the step (a) may be done entirely in the absence of water, in which case, the iron may be oxidized by the carbonate itself.

Some embodiments provide that the carbonate, bicarbonate, or mixture thereof comprises a carbonate of sodium or potassium. Sodium carbonate may be preferred in the case of a manganese system, while sodium or potassium carbonates may be suitable for use with iron systems. In such cases, the corresponding alkali metal ion-transition metal oxide can comprise a composition having an empirical formula $AMO_2$, where A represents the alkali metal ion.

The following Embodiments are intended to be representative of the total disclosure, but not limiting to the specific examples set forth herein. Other Embodiments will be apparent to those skilled in the art.

Embodiment 1

A process comprising extracting carbon dioxide from an air stream by contacting the air stream with a composition comprising an alkali metal ion-transition metal oxide of empirical formula $A_xMO_2$ ($0.1 < x \le 1$) to form a transition metal composition comprising an oxidized ion extracted-transition metal oxide, where A represents the alkali metal ion comprising sodium ion, potassium ion, or a combination thereof and M comprises iron, manganese, or a combination thereof. In specific Aspects of this Embodiment, ($0.1 < x < 1$).

In some Aspects of this Embodiment, the alkali metal ion-transition metal oxide is derived from the thermochemical water splitting reaction set forth elsewhere herein and may be compositionally defined in those terms, if different than set forth here. The alkali metal ion-transition metal oxide is alkaline, at least in the context of that derived from the thermochemical water splitting reaction set forth elsewhere herein.

Each permutation of the sodium ion, potassium ion, or a combination thereof and iron, manganese, or a combination thereof is considered an independent Aspect of this Embodiment. In preferred, non-exclusive Aspects of this Embodiment, M is or comprises manganese.

Embodiment 2

The process of Embodiments 1, wherein the contacting is done in the presence of water or steam.

In some Aspects of this Embodiment, the water or steam is added to the alkali metal ion-transition metal oxide before adding the carbon dioxide. In other Aspects of this Embodiment, the water or steam is added to the alkali metal ion-transition metal oxide at the same time as the carbon dioxide is added.

Embodiment 3

The process of Embodiment 1 or 2, wherein the contacting is done at a temperature in a range of from about 60° C. to 250° C.

In some Aspects of this Embodiment, the carbon dioxide and/or water is added to the alkali metal ion-transition metal oxide at a temperature outside these boundaries (e.g., at a lower temperature) and the combined mixture is heated to within this range. In other Aspects of this Embodiment, the carbon dioxide and/or water is added to the alkali metal ion-transition metal oxide at a temperature within this range.

It should be appreciated that independent Aspects of this Embodiment include those where the temperature is defined by a range of from 60° C. to 70° C., 70° C. to 80° C., 80° C. to 90° C., 90° C. to 100° C., 100° C. to 110° C., 110° C. to 120° C., 120° C. to 130° C., 130° C. to 140° C., 140° C. to 150° C., 150° C. to 160° C., 160° C. to 170° C., 170° C. to 180° C., 180° C. to 190° C., 190° C. to 200° C., 200° C. to 210° C., 210° C. to 220° C., 220° C. to 230° C., 230° C. to 240° C., 240° C. to 250° C., and any combination of two or more of the foregoing ranges.

Embodiment 4

The process of any one of Embodiments 1 to 3, wherein the air stream is atmospheric air, optionally having a $CO_2$ content in a range of from 150 ppm to 500 ppm by weight, from 150 ppm to 450, from 200 to 400 ppm, or from 300 ppm to 400 ppm by weight.

The efficiency of the alkali metal ion-transition metal oxide to scrub carbon dioxide from such air feeds is considered unexpected.

In certain Aspects of this Embodiment, the atmospheric air is at ambient temperature. In other Aspects, the atmospheric air is heated before contacting the alkali metal ion-transition metal oxide.

Embodiment 5

The process of any one of Embodiments 1 to 4, wherein the air stream containing the carbon dioxide is delivered to the alkali metal ion-transition metal oxide using a solar updraft air tower. While any means of providing such air feeds to a reactor comprising the alkali metal ion-transition metal oxide would also be appropriate, the solar updraft air tower provides the economic benefit as set forth elsewhere herein.

Embodiment 6

The process of any one of Embodiments 1 to 5, wherein the alkali metal ion-transition metal oxide has an empirical formula $A_xMO_2$, where x is in a range of from 0.1, 0.2, 0.3, 0.4, 0.5, 0.6, 0.7, 0.8, or 0.9 to 1.

In certain independent Aspects of this Embodiment, x is defined by a range of from 0.1 to 0.2, from 0.2 to 0.3, from 0.3 to 0.4, from 0.4 to 0.5, from 0.5 to 0.6, from 0.6 to 0.7, from 0.7 to 0.8, from 0.8 to 0.9, from 0.9 to 1.0, or any combination of two or more of these foregoing ranges.

Embodiment 7

The process of any one of Embodiments 1 to 6, wherein the alkali metal ion-transition metal oxide is generated in a second process of thermochemically forming $H_2$, $O_2$, or both $H_2$ and $O_2$, each independently/separately, from water, said second process comprising:

(a) contacting a composition comprising a spinel-type transition metal oxide of formula $M_3O_4$ with an alkali metal carbonate, bicarbonate, or mixture thereof in the presence of $H_2O$ at a first temperature in a range of from 450° C. to 1000° C. to form $H_2$ $CO_2$, and the alkali metal ion-transition metal oxide, said alkali metal ion-transition metal oxide having an average transition metal oxidation state that is higher than the average oxidation state of the transition metal in the spinel-type transition metal oxide;

(b) hydrolytically extracting at least a portion of alkali metal ions from the alkali metal ion-transition metal oxide by the reaction with $CO_2$, and liquid $H_2O$ at a second temperature in a range of from 60° C. to 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion-transition metal oxide; and (c) thermochemically reducing the transition metal composition of step (b) at a third temperature in a range of from 450° C. to 1150° C., with the associated formation of $O_2$:

wherein the transition metal, M, comprises iron, manganese, or a combination thereof, and the corresponding spinel-type transition metal oxide comprises $Fe_3O_4$, $Mn_3O_4$, or a solid solution or physical mixture thereof; and wherein the alkali metal ion comprises sodium ion, potassium ion, or a combination thereof.

Embodiment 8

The process of any one of Embodiments 1 to 6, wherein the alkali metal ion-transition metal oxide is generated in any process described in U.S. Pat. No. 8,940,269 or 9,296,042.

While the second process described in Embodiments 7 and 8 provides a context in which the captured carbon dioxide is released after capture, it should be appreciated that Embodiments 1 to 6 do not necessarily rely on the release mechanism set forth in these latter Embodiments.

Embodiment 9

The process of Embodiment 7 or 8, wherein the $H_2$ and $CO_2$ generated by the second process is captured. The resulting $H_2$ and $CO_2$ may be captured for further use, may be temporarily or permanently sequestered, may be used either together or independently, or with other feedstocks for other purposes.

Embodiment 10

The process of any one of Embodiments 7 to 9, wherein the $H_2$ and $CO_2$ generated by the second process is captured and converted to (a) syngas via the reverse water gas shift reaction or (b) to methanol by hydrogenation of the $CO_2$ or (c) to higher hydrocarbons by upgrading the $CO_2/H_2$ stream. The technologies for such conversions are well understood by those skilled in the art and need not be set forth here (see, for example, the references cited in Attachment I for review articles to this effect)

Embodiment 11

The process of any one of Embodiments 1 to 10, where energy for the process or the second process is derived from solar energy, preferably via solar concentrator, wind, wind, water or wave energy, internal combustion (e.g., coal, oil or other liquid fuels), or electric, or a combination thereof.

In independent Aspects of this Embodiment, some or all the energy for the process or second process may be derived from solar energy, either directly (e.g., solar concentrators) or indirectly (solar cells forming electricity). In other independent Aspects of this Embodiment, some or all the energy for the process or second process may be derived from other sources, including wind, water or wave energy, internal combustion (e.g., coal, oil or other liquid fuels), fuel cells or flow batteries, or electric. Solar, wind, or water or wave energy are preferred, solar energy being more preferred economically.

Embodiment 12

The process of any one of Embodiments 7 to 11, wherein the second process is operated one or more times a day or continuously.

Embodiment 13

The process of any one of Embodiments 7 to 12, wherein the step (a) of contacting the composition comprising a spinel-type transition metal oxide of formula $M_3O_4$ with an alkali metal carbonate, bicarbonate, or mixture thereof is done stepwise first in the absence and then in the presence of $H_2O$.

Embodiment 14

The process of any one of Embodiments 7 to 13, wherein the carbonate, bicarbonate, or mixture thereof comprises a carbonate.

Embodiment 15

The process of any one of Embodiments 7 to 14, wherein the alkali metal ion-transition metal oxide comprises a composition having an empirical formula $AMO_2$, where A represents the alkali metal ion.

Embodiment 16

The process of any one of Embodiments 7 to 15, wherein at least one of the first and third temperatures is in a range of from 750° C. to 850° C.

Embodiment 17

The process of any one of Embodiments 7 to 16, wherein the second temperature is (1) in a range of from about 60° C. to about 95° C., at ambient atmospheric pressure or (2) in a range of from about 100° C. to about 250° C., wherein the $CO_2$ is present at a partial pressure in a range of from about 1 bar to about 25 bar.

Embodiment 18

The process of any one of Embodiments 7 to 17, wherein the third temperature is in a range of from 550° C. to 1150° C.

Embodiment 19

The process of any one of Embodiments 7 to 18, wherein the thermochemical reduction of the oxidized-transition metal oxide results in a regeneration of the spinel-type transition metal oxide of (a).

Embodiment 20

The process of any one of Embodiments 7 to 19, wherein the transition metal comprises manganese; the carbonate, bicarbonate, or mixture thereof comprises a carbonate; and the alkali metal ion comprises sodium ion.

Embodiment 21

The process of Embodiment 20, wherein the alkali metal ion-stabilized oxidized-transition metal oxide comprises a composition having an empirical formula of $NaMnO_2$, formed by at least one reaction resulting from contacting sodium carbonate and $Mn_3O_4$.

Embodiment 22

The process of Embodiment 21, wherein the at least one reaction resulting from contacting sodium carbonate and $Mn_3O_4$ is according to the stoichiometries:

$$Na_2CO_3 + Mn_3O_4 \rightarrow 2NaMnO_2 + CO_2 + MnO; \text{ and} \qquad (i)$$

$$2MnO + Na_2CO_3 + H_2O \rightarrow H_2 + CO_2 + 2NaMnO_2. \qquad (ii)$$

Embodiment 23

The process of any one of Embodiments 20 to 22, wherein the alkali metal ion-stabilized oxidized-transition metal oxide comprises α-NaMnO$_2$.

Embodiment 24

The process of any one of Embodiments 20 to 23, wherein the alkali metal ion is Na$^+$ and the alkali metal ion transition metal oxide comprises a composition having an empirical formula NaMnO$_2$.

Embodiment 25

The process of any one of Embodiments 20 to 24, wherein the alkali metal ion transition metal oxide comprises a composition having a stoichiometry of NaMnO$_2$ and the extraction of the Na$^+$ from the NaMnO$_2$ is characterized by a stoichiometry:

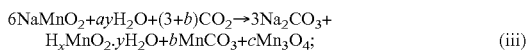

$$6\text{NaMnO}_2 + ay\text{H}_2\text{O} + (3+b)\text{CO}_2 \rightarrow 3\text{Na}_2\text{CO}_3 + \text{H}_x\text{MnO}_2 \cdot y\text{H}_2\text{O} + b\text{MnCO}_3 + c\text{Mn}_3\text{O}_4; \quad \text{(iii)}$$

Embodiment 26

The process of any one of Embodiments 20 to 25, wherein the transition metal composition of step (b) comprises a protonic birnessite, and the thermochemical reduction of this product is done at the third temperature in a range of from 750° C. to 850° C.

Embodiment 27

The process of any one of Embodiments 20 to 26, wherein (c) is characterized by a stoichiometry:

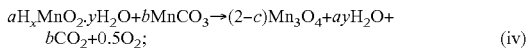

$$a\text{H}_x\text{MnO}_2 \cdot y\text{H}_2\text{O} + b\text{MnCO}_3 \rightarrow (2-c)\text{Mn}_3\text{O}_4 + ay\text{H}_2\text{O} + b\text{CO}_2 + 0.5\text{O}_2; \quad \text{(iv)}$$

Embodiment 28

The process of any one of Embodiments 20 to 27, said method comprising:
(a) contacting a composition comprising a spinel-type Mn$_3$O$_4$ with sodium carbonate in the presence of H$_2$O at a first temperature in a range of from about 550° C. to about 900° C., to form H$_2$, CO$_2$, and a sodium birnessite-type A$_x$MnO$_2$ (0<x<1), the sodium birnessite-type manganese dioxide having an average transition metal oxidation state that is higher than the average oxidation state of the transition metal in the spinel-type Mn$_3$O$_4$;
(b) hydrolytically extracting at least a portion of sodium cations from the sodium birnessite-type manganese dioxide by the reaction with CO$_2$ and liquid H$_2$O at a second temperature in a range of (1) from about 70° C. to about 90° C. at ambient pressure or (2) from about 140° C. to about 200° C. at a partial pressure of CO$_2$ in a range of from about 3 bar to about 20 bar to form a transition metal composition comprising an protonic birnessite in which the average oxidation state of the transition metal in the protonic birnessite is the same as the average oxidation state of the transition metal in the sodium birnessite-type manganese dioxide; and
(c) thermochemically reducing the transition metal composition of step (b) at a third temperature in a range of from about 550° C. to about 900° C., preferably about 850° C., with the associated formation of O$_2$.

Embodiment 29

The process of any one of Embodiments 7 to 21, wherein the transition metal comprises iron; the carbonate, bicarbonate, or mixture thereof comprises a carbonate; and the alkali metal ion comprises sodium ion, potassium ion, or a combination thereof.

Embodiment 30

The process of Embodiment 29, wherein the alkali metal ion-transition metal oxide is NaFeO$_2$ or KFeO$_2$, formed by the reactions between Fe$_3$O$_4$ and sodium carbonate or between Fe$_3$O$_4$ and potassium carbonate, respectively.

Embodiment 31

The process of Embodiment 29 or 30, wherein the alkali metal ion is Na$^+$ or K$^+$ or a combination thereof, and the alkali metal ion-transition metal oxide comprises a composition having a stoichiometry of NaFeO$_2$ or KFeO$_2$.

Embodiment 32

The process of any one of Embodiments 7 to 21 or 29 or 30, the process comprising:
(a) contacting a composition comprising a spinel-type Fe$_3$O$_4$ with sodium or potassium carbonate, or a mixture thereof, in the presence of H$_2$O at a first temperature in a range of from about 550° C. to about 900° C., to form H$_2$, CO$_2$, and a sodium- or potassium-type A$_x$FeO$_2$ (0<x<1), the sodium- or potassium-type iron dioxide having an average transition metal oxidation state that is higher than the average oxidation state of the transition metal in the spinel-type Fe$_3$O$_4$;
(b) hydrolytically extracting at least a portion of sodium cations from the sodium- or potassium-type iron dioxide by the reaction with CO$_2$ and liquid H$_2$O at a second temperature in a range of (1) from about 70° C. to about 90° C. at ambient pressure or (2) from about 140° C. to about 200° C. at a partial pressure of CO$_2$ in a range of from about 3 bar to about 20 bar to form a transition metal composition comprising Fe$_2$O$_3$ or a hydrated form thereof, in which the average oxidation state of the transition metal is the same as the average oxidation state of the transition metal in the Fe$_2$O$_3$ or a hydrated form thereof, and
(c) thermochemically reducing the transition metal composition of step (b) at a third temperature in a range of from about 1150° C. to about 1250° C., with the associated formation of O$_2$.

Embodiment 33

A catalytic cycle comprising the process of any one of Embodiments 1 to 21, the steps being performed in order (a), then (b), then (c) at least 5 times.

Embodiment 34

The process of Embodiment 28, wherein the sodium birnessite-type A$_x$MnO$_2$ (0<x<1) is derived from α-NaMnO$_2$.

Embodiment 35

The process of Embodiment 32, wherein the sodium- or potassium-type $A_xFeO_2$ (0<x<1), is $NaFeO_2$ or $KFeO_2$.

EXAMPLES

Figure 6A:
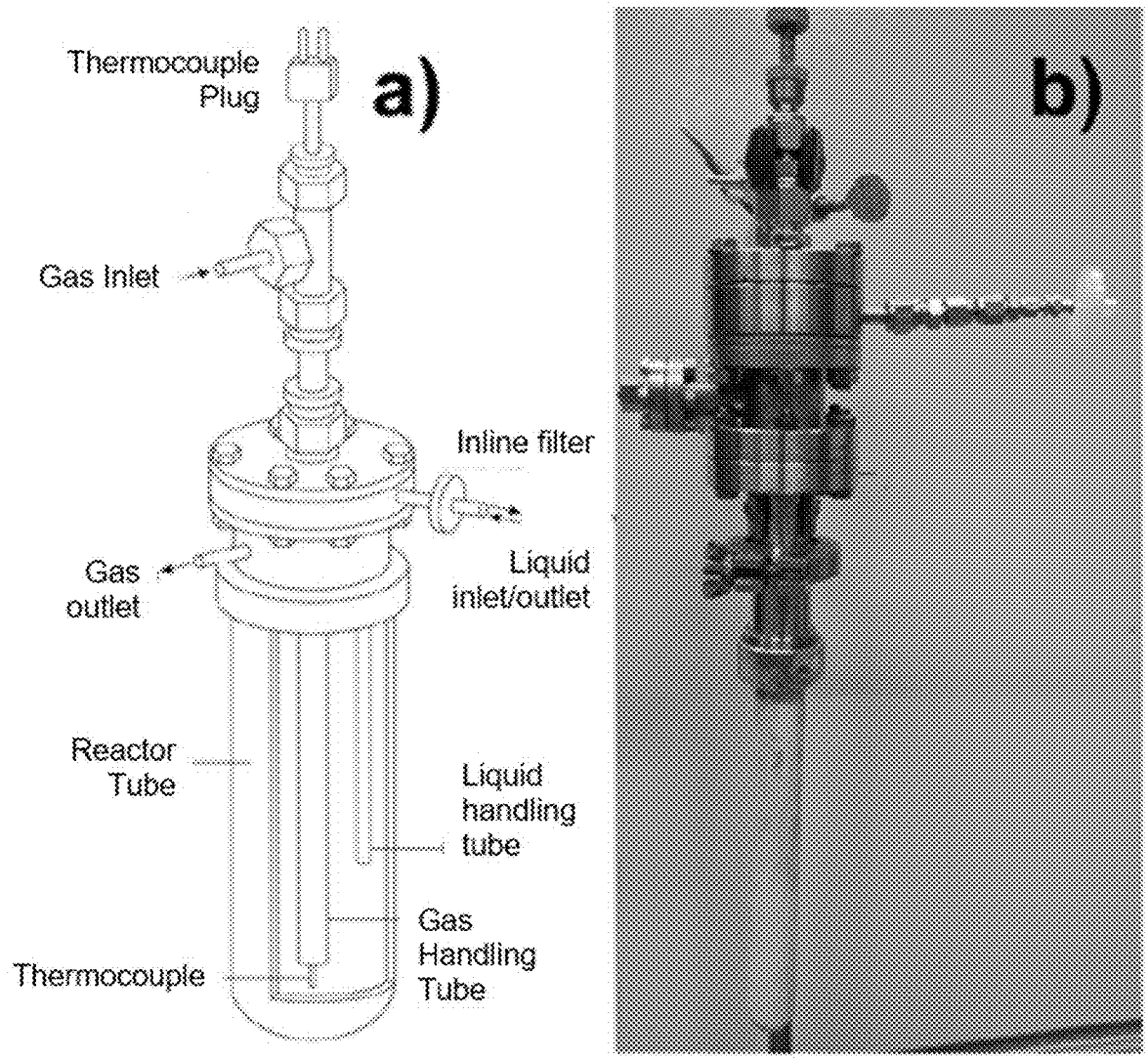
FIG. 6A shows an experimental reactor used in Examples.
Figure 6B:
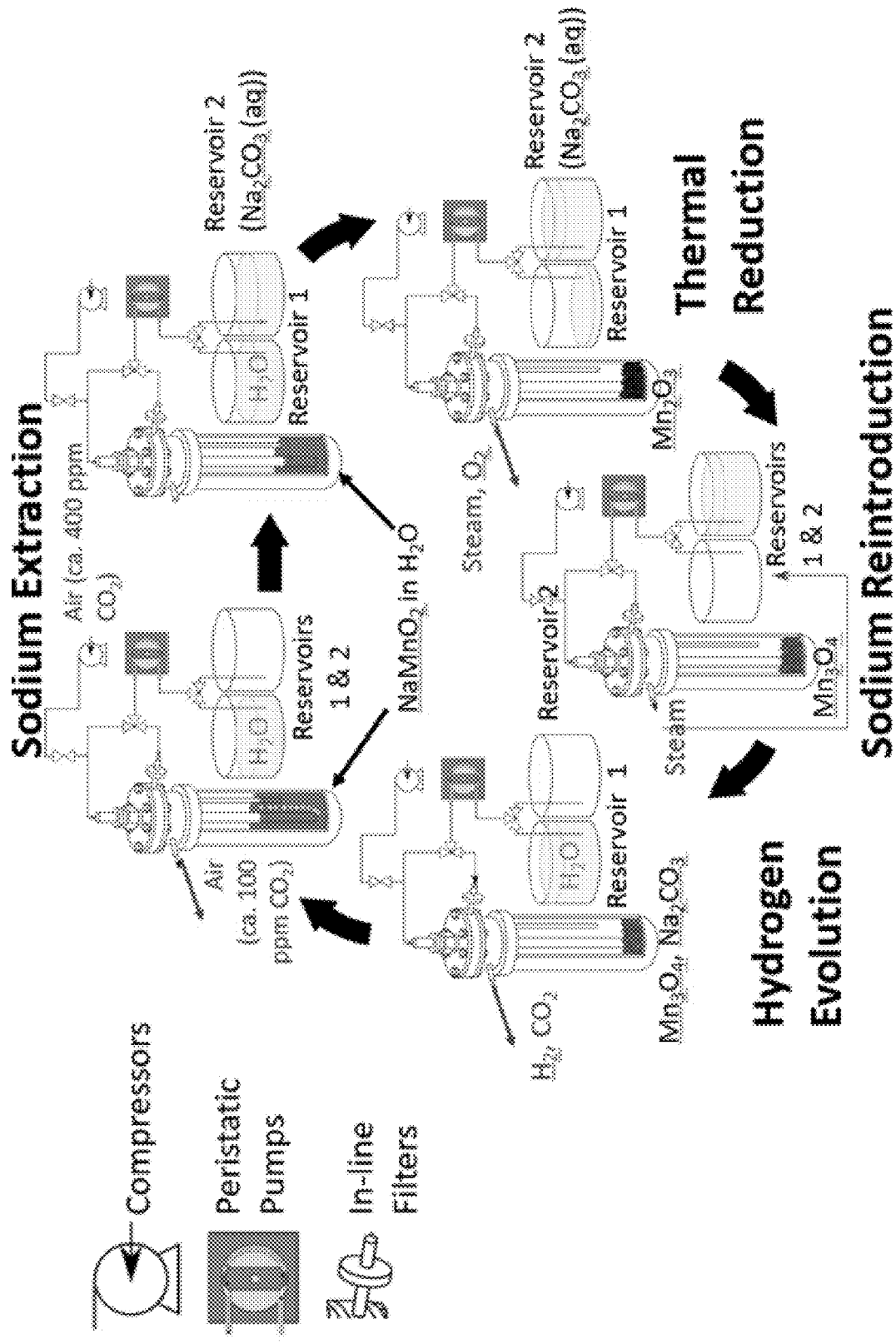
FIG. 6B schematically illustrates an experimental set-up for conducting thermochemical water splitting cycles.
Figure 6C:
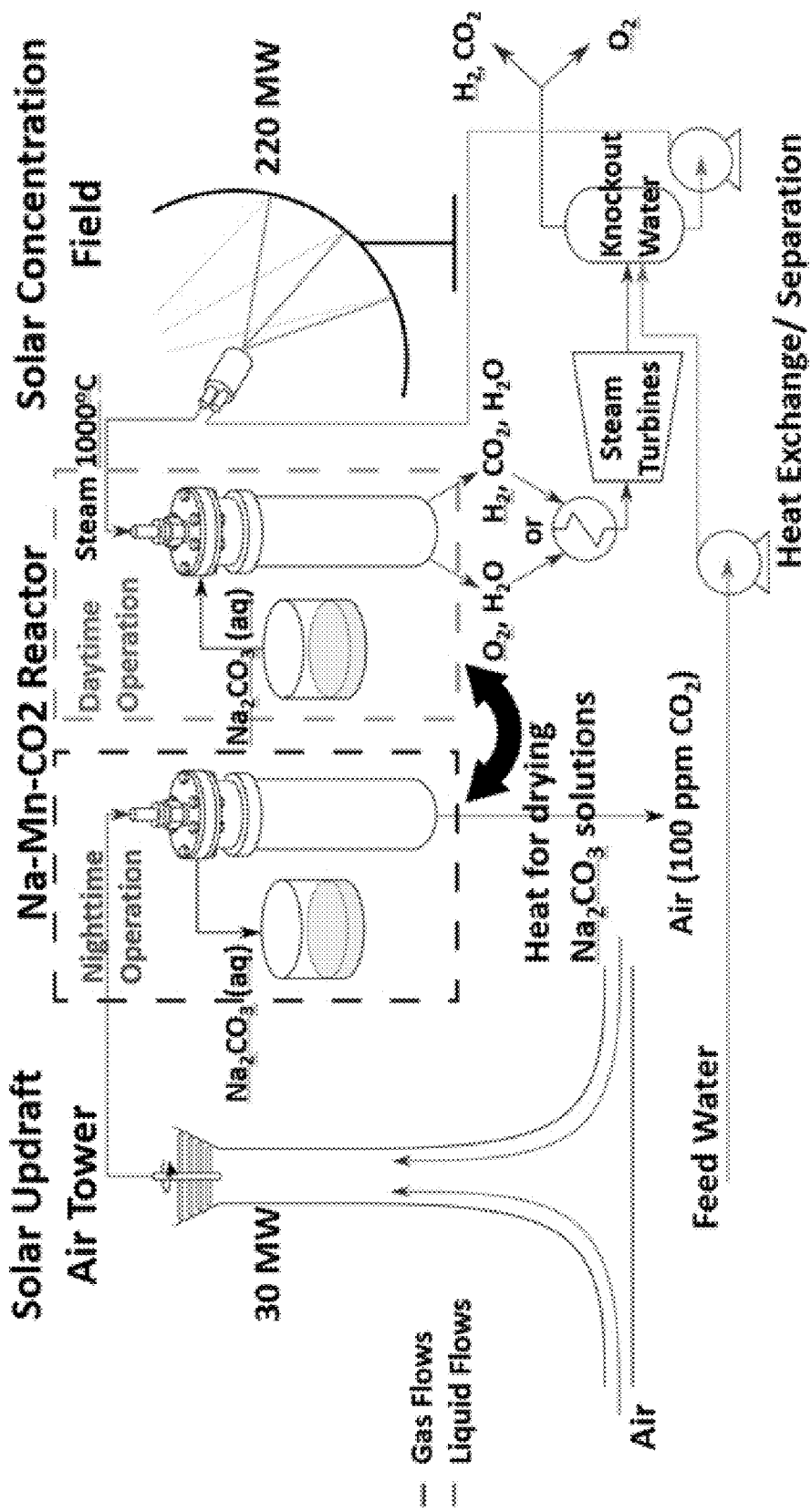
FIG. 6C schematically illustrates a proposed integrated DAC and TWS process.
Figure 6D:
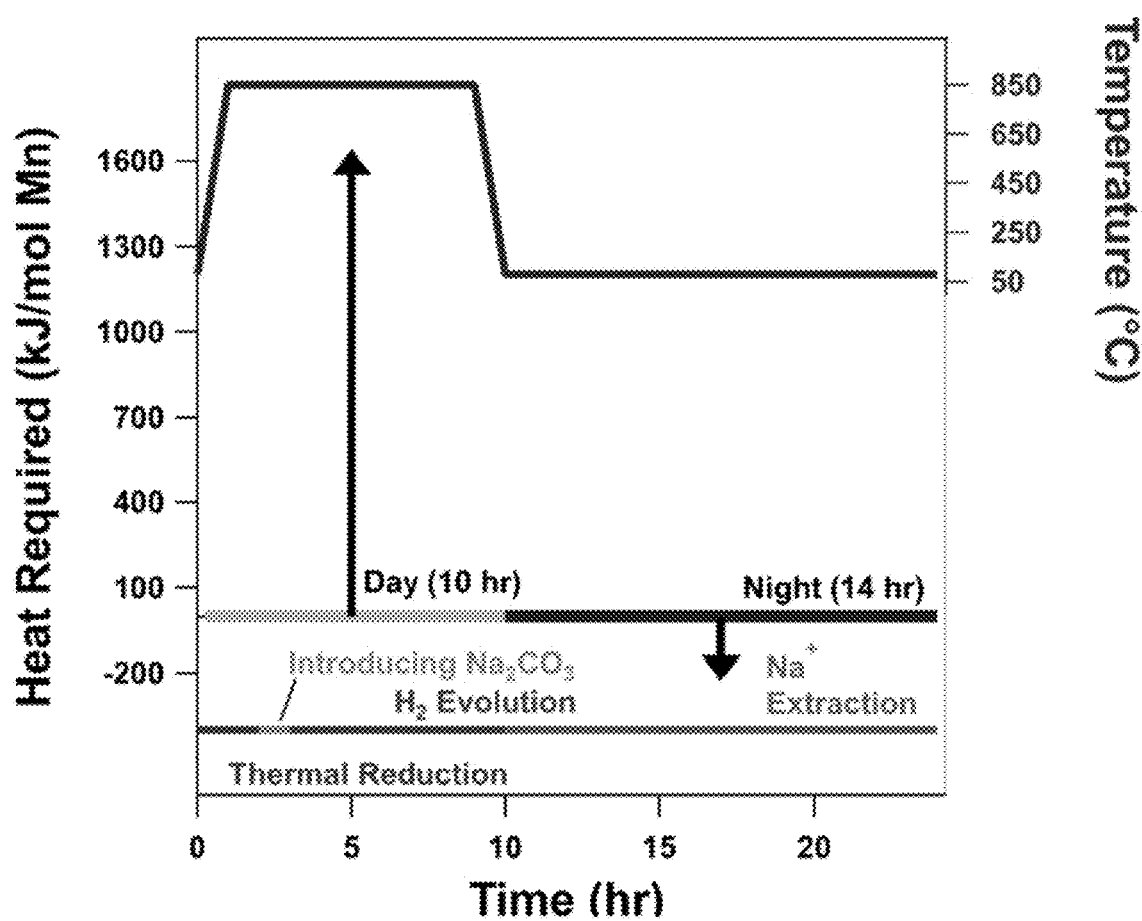
FIG. 6D illustrates one potential, albeit non-limiting schedule for a quasi-batch TWS-DAC process as set forth herein.

Descriptions of Drawings and Experiments:
Materials and Methods:
Cycling Tests:

The experimental test reactor was constructed from readily available parts (see, e.g., FIG. 6A). The reactor tube was an 8.5" long close ended $Al_2O_3$ tube with an outer diameter of 1" and an inner diameter of 0.75". The gas handling and liquid handing tubes were $Al_2O_3$ tubes with outer diameters of ¼" and ⅛" and inner diameters of 3/16" and 1/16" respectively. All $Al_2O_3$ tubes were purchased from AdValue Technologies. An Inconel clad thermocouple (Omega) was threaded through the gas handling tube in order to accurately temperatures in the reactor tube. All gas flows were controlled with Brooks mass flow controllers. Steam was introduced via a Cole Parmer syringe pump with a 60 mL syringe. All other liquid additions or extractions were performed using the reactor syringe port using a Corning 0.20 μm nylon filter as an inline filter. The reactor was heated by a clam shell furnace (Lingberg/Blue M) and the gas distribution section was heated to 150° C. to prevent condensation of steam. All heaters and MFCs were controlled via an integrated LabVIEW program. An online differentially pumped RGA (Stanford Research Instruments RGA100) was used to quantify gas products and a 100 mL condenser suspended in an ice bath was positioned upstream of the RGA to remove excess water.

Cycling experiments were performed by first preparing a physical mixture of $Mn_3O_4$ and $Na_2CO_3$(Sigma Aldrich) via grinding in a mortar and pestle. This mixture was then loaded into the reactor with care as not to clog the gas handling tube with solids. The water splitting step was performed by first heating the physical mixture to 850° C. under a flowrate of 50 sccm of nitrogen at a ramping rate of 10° C./min. After the set temperature was reached, steam was introduced to the heated inlet gas line by syringe pump at a rate of 2 mL/hr of liquid. Once the reaction was completed (hydrogen production ceases) the steam flowrate was stopped, and the reactor was cooled to room temperature under nitrogen.

Once cool sodium extraction is performed. First, approximately 40 mL of DI water was introduced to the reactor using the syringe port on the side of the reactor and the reactor was heated to ~80° C. while 50 sccm of $N_2$ was bubbled through the solution. Once the reactor had reached the set temperature a small flowrate of $CO_2$ was introduced into the nitrogen carrier gas such that a 5% $CO_2$ in $N_2$ stream at 50 sccm was fed to the reactor. The online RGA was used to measure $CO_2$ concentration during this time to establish a rough degree of extraction. Sodium extraction was performed in three steps starting from 5% $CO_2$ in $N_2$, 10% $CO_2$ in $N_2$ and finally pure $CO_2$ to insure complete sodium extraction. Between each step ~40 mL of liquid was extracted, filtered and replaced with the same volume of DI water using the inline filter attached to the syringe port. After the pH of the extracted solution was ~7.5 to 8 the reactor was heated to and held at 100° C. for several hours to remove the remaining water.

Thermal reduction of the post extraction solid was performed by heating the reactor to 850° C. at a rate of 10° C./min under a flow of 50 sccm of nitrogen. The RGA was used to quantify produced $O_2$ and the reactor was cooled once oxygen production ceased. After cooling to room temperature an aqueous solution of $Na_2CO_3$ was introduced to the reactor via the syringe port and the reactor was heated to 100° C., removing water and leaving a physical mixture of $Mn_3O_4$ and $Na_2CO_3$ which was used in the next cycle.

Air Scrubbing Tests:

Air scrubbing tests were performed using a small 4" closed-end $Al_2O_3$ tube with an outer diameter of 1" and an inner diameter of 0.75". A 60 sccm flowrate of air was supplied with a small 5 VDC diaphragm pump with a potentiometer to control the flowrate. The same RGA as above was used to track $CO_2$ concentration during sodium extraction. A ppm level $CO_2$ calibration was obtained for the RGA by diluting atmospheric air with nitrogen in various ratios. $NaMnO_2$ used in tests was synthesized via solid state synthesis using stoichiometric amounts of $Mn_2O_3$ (Sigma Aldrich) and $Na_2CO_3$ heated in air at 700° C. for 6 hours.

Results and Discussion
Reactor Design

The drastically different operating conditions, i.e., solid-gas phase reactions at 850° C. for hydrogen and oxygen evolutions, and solid-liquid phase Na+ extraction and $CO_2$ capture at 90° C. provided a key challenge in the implementation the experiments disclosed herein. The fabricated reactor (FIG. 6A) eliminated the need to move of solids with a capacity of handling ~10 g solid. The reactor consisted of an alumina vessel with multiple inlets and outlets to control the flow of liquids and gases into and out of the reaction zone. Using this configuration, it was possible to show that all three steps in the Mn—Na—$CO_2$ TWS cycle can be conducted in the fabricated reactor with close to stoichiometric $H_2$ and $O_2$ yields in multiple cycles.

Hydrogen Evolution

Figure 7A:
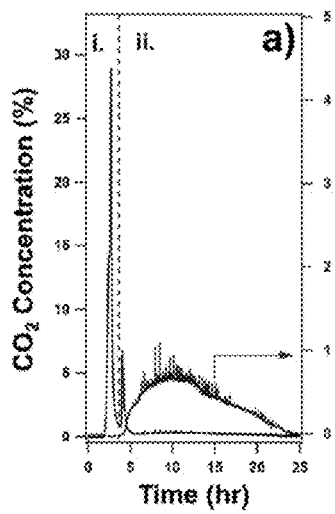
FIGS. 7A-C illustrate gas phase composition data for the three steps in the water splitting cycle.

During hydrogen evolution, a stoichiometric mixture of $Mn_3O_4$ and $Na_2CO_3$ (2:3 molar ratio) was initially heated to 850° C. under an inert gas flow and then under steam to form $NaMnO_2$, $CO_2$, and $H_2$. Prior to the introduction of steam (section i in FIG. 7A), the only gas phase product formed as the solid mixture is heated to 850° C. was $CO_2$. This reaction led to the formation of a 2:1 ratio of α-$NaMnO_2$ and MnO. No oxidation state change of manganese occurred in this step, as $Mn^{III}$ and $Mn^{II}$ in $Mn_3O_4$ formed α-$NaMnO_2$ and MnO, respectively. Upon introduction of steam to the solid mixture at 850° C. at the end of 5 h (section ii in FIG. 7A), MnO was oxidized by water in the presence of unreacted $Na_2CO_3$ to form additional α-$NaMnO_2$, and a mixture of $H_2$ and $CO_2$ with a molar ratio of 1:1

Figure 7B:
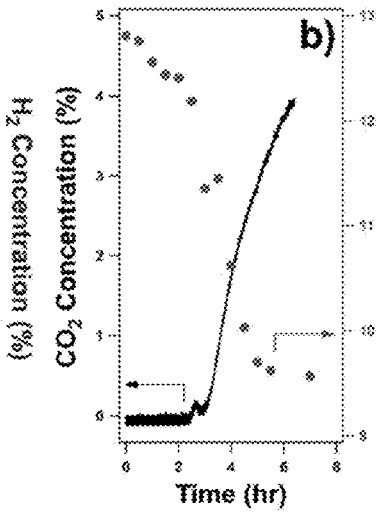

Sodium Extraction $Na^+$ intercalated in the MnOx layers of α-$NaMnO_2$ must be removed before $Mn_3O_4$ can be thermally regenerated to complete the TWS cycle. Sodium extraction was performed by cooling the solids produced in the hydrogen evolution step to 90° C., followed by introducing water to the reactor via the liquid inlet and bubbling 5% $CO_2$ in $N_2$ via the gas inlet into the liquid-solid slurry. Initially complete $CO_2$ absorption was observed (FIG. 7B), demonstrating the high binding affinity of $Na^+$ to carbonate and facile sodium extraction from the birnessite phase formed upon contact of α-$NaMnO_2$ with liquid water. A detectable amount of $CO_2$ was observed after 2.3 h in the breakthrough curve, followed by a quick increase of the $CO_2$ concentration to the level in the feed. Periodic pH measurements of the slurry during extraction revealed that the slurry was very alkaline in nature, with an initial pH of 12.8, that decreased gradually as $CO_2$ in adsorbed into the liquid. This indicated that $Na^+$ was gradually extracted from the birnessite phase by $CO_2$.

The onset of incomplete $CO_2$ adsorption occurred when the pH of the slurry decreased to ~11.4, that corresponded to ~63% of $Na^+$ extracted based on the amount of $CO_2$ absorbed. The final pH of the slurry was ~9.6, that was roughly consistent with the formation of a $Na_2CO_3$—$NaHCO_3$ buffer after the majority of $Na^+$ had been extracted from the solid. Upon the completion of the sodium extraction, the $Na_2CO_3$—$NaHCO_3$ solution was extracted from the liquid outlet equipped with an in-line filter.

Thermal Reduction

Figure 7C:
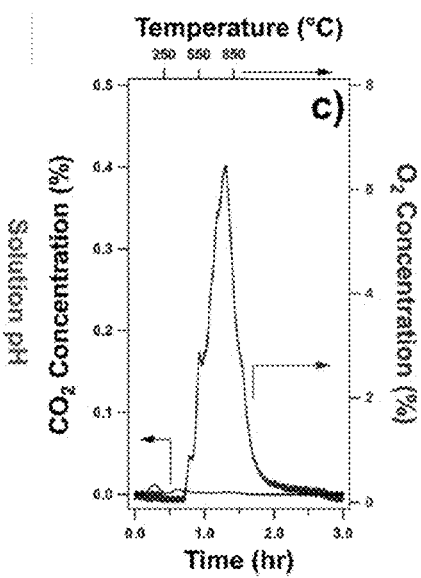

The solid component remaining in the reactor from the sodium extraction step was dried and heated to 850° C. to regenerate $Mn_3O_4$. $O_2$ is produced during the temperature ramp and hold (FIG. 7C) due to the thermal reduction of manganese oxides produced in the previous step to $Mn_3O_4$. Additionally, a negligible amount of $CO_2$ was also produced during this step via decomposition of $MnCO_3$ (formed during sodium extraction) during heating. Higher amounts of $CO_2$ formation were observed at these higher weight percentage levels of α-$NaMnO_2$ weight percentage in the slurry during sodium extraction (~15 wt %) than in experiments conducted at lower levels (~5 wt %). It is desirable for $CO_2$ evolution to only take place during the $H_2$ production step as mixtures of $CO_2$ and $H_2$ are valuable while mixtures of $CO_2$ and $O_2$ would require costly separation. At the end of the thermal reduction step, the reactor was cooled to ~100° C., after which time a $Na_2CO_3$ solution was introduced. Evaporating the water yielded a solid mixture of $Na_2CO_3$ and $Mn_3O_4$ ready for the hydrogen evolution step in the subsequent cycle.

Overall Cycling Performance

Figure 9:
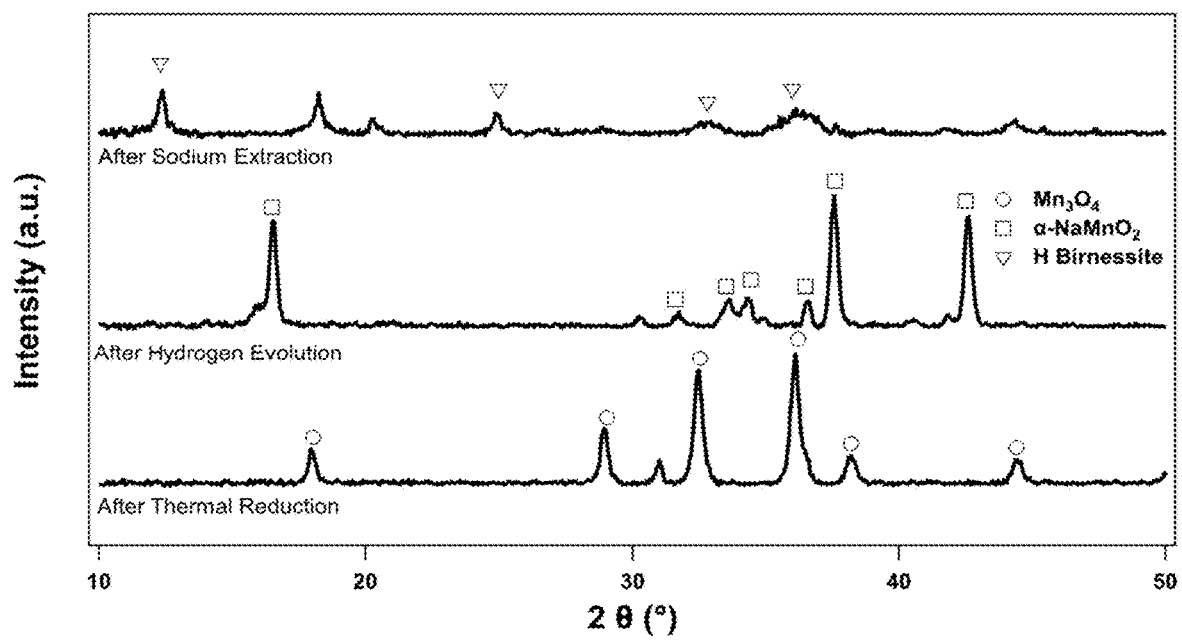
FIG. 9 shows XRD patterns of the Na-MnOx solids after 6 cycles.
Figure 8A:
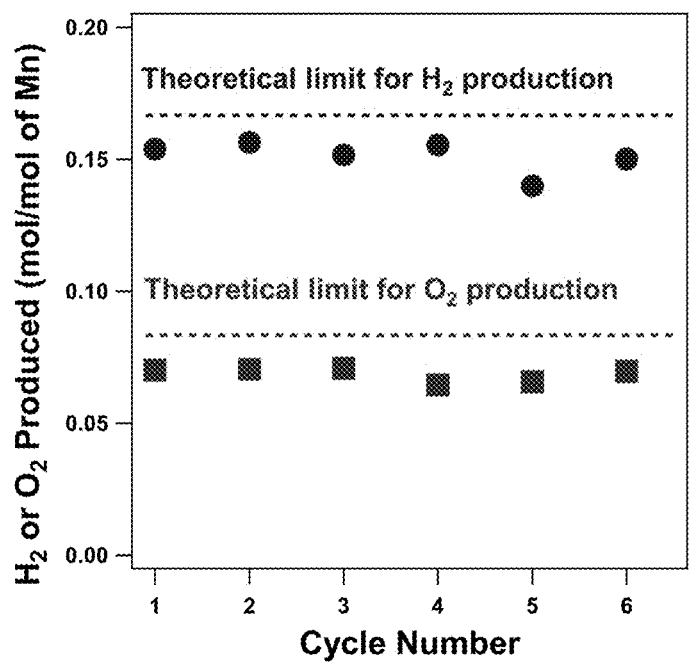
FIGS. 8A-B shows results from six thermochemical cycles of splitting water as set forth in the Examples. Amounts of $H_2$ and $O_2$ produced (FIG. 8A), and $CO_2$ captured/produced (FIG. 8B) in six consecutive TWS cycles.
Figure 8B:
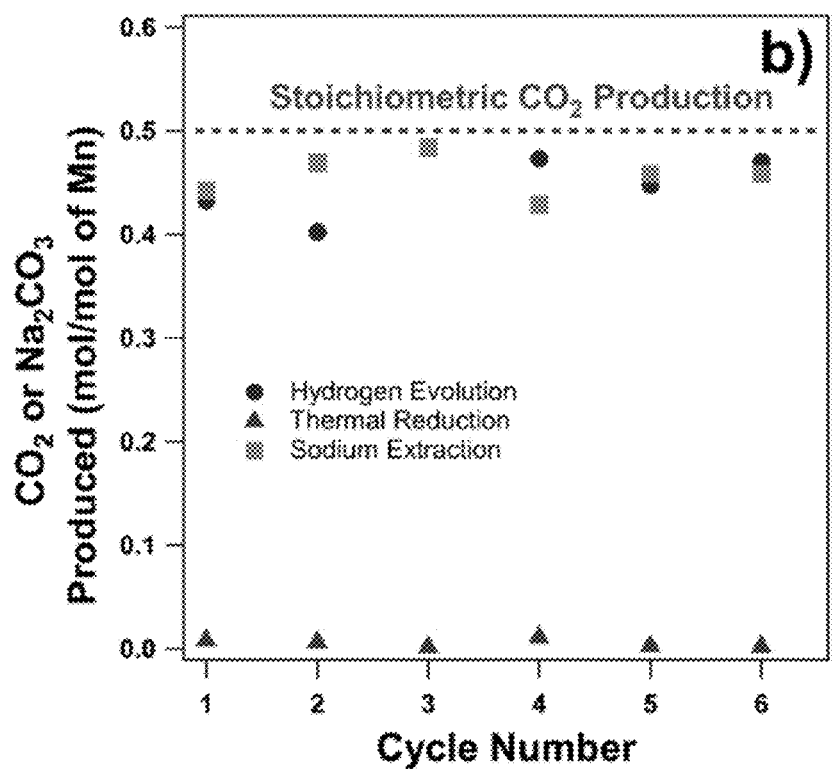

Near theoretical yields of $H_2$ and $O_2$ were produced from the Mn—Na—$CO_2$ TWS cycle in the fabricated reactor over the course of six consecutive cycles (FIG. 8A). A stoichiometric mixture of $Mn_3O_4$/$Na_2CO_3$ was charged in the reactor prior to the hydrogen evolution step of the first cycle, and no additional manganese oxide was added to or removed from the reactor in all consecutive cycles. Roughly 90% of the theoretical amounts of $H_2$ and $O_2$ were produced in each cycle (FIG. 8A) with no discernable decrease in production with increasing cycles. The lack of deactivation was in part due to the fact that complete phase change was involved in every step, e.g., the intercalation of $Na^+$ into and extraction of $Na^+$ from $MnO_x$ layers. Thus, each cycle had a fresh start without any "memory" from previous cycles. Further, roughly 90% of stoichiometric amount of $CO_2$ was produced in the hydrogen evolution step in each cycle (FIG. 8B), with a negligible amount of $CO_2$ produced in the thermal reduction step. Powder X-ray diffraction patterns of solids after all three steps in the 6th cycle were collected (FIG. 9) and the data confirm that the expected phases were formed. Results from these cycling experiments demonstrated that the fabricated reactor could be used to facilitate the Mn—Na—$CO_2$ TWS cycle.

Figure 10A:
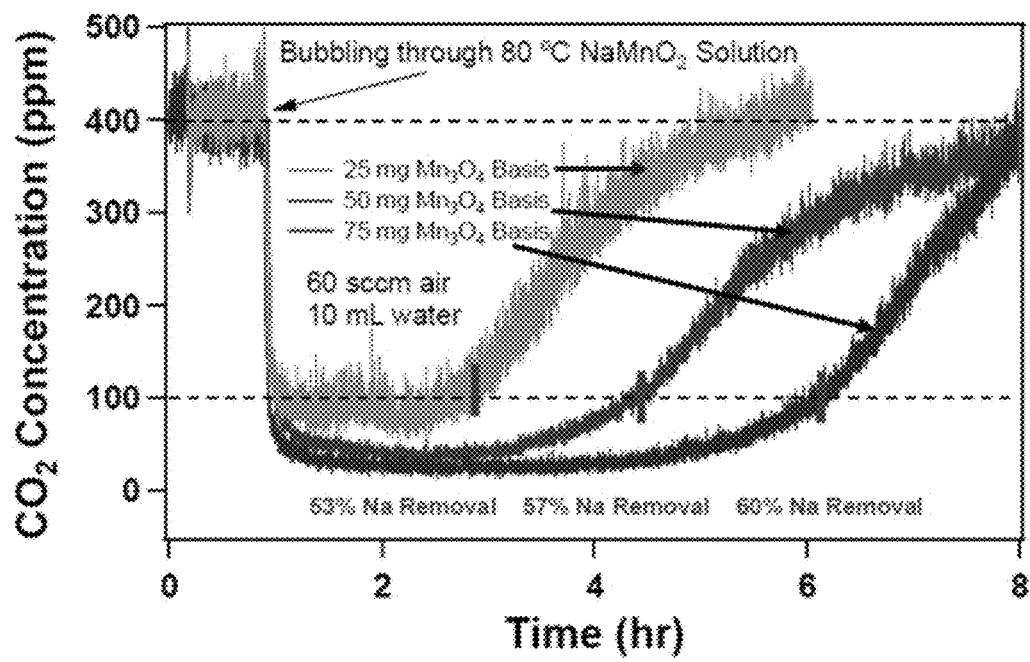
FIGS. 10A-B shows results of extracting carbon dioxide from an air stream as set forth in the Examples.
Figure 10B:
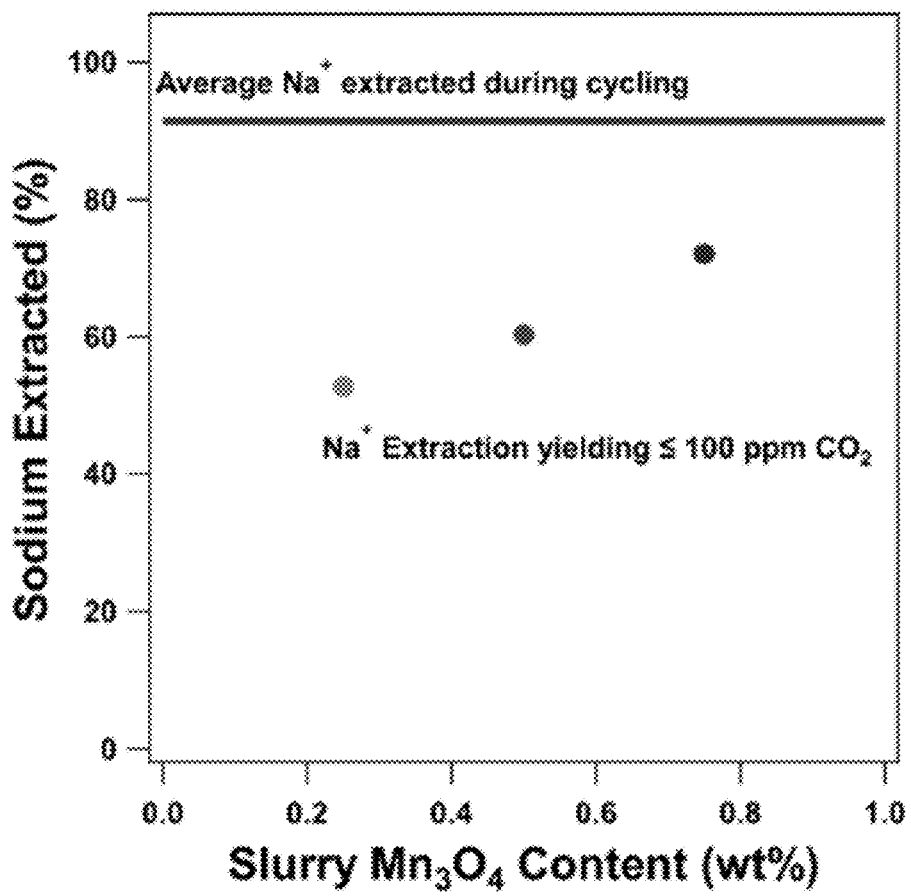

Direct Air Capture (DAC) of $CO_2$ with Mn—Na—$CO_2$ Thermal Water Splitting (TWS) Cycle The alkaline nature of aqueous suspensions of α-$NaMnO_2$ (FIG. 7B) suggested that it could be an effective adsorbent for $CO_2$ DAC. To evaluate the feasibility of this, ambient air with ~400 ppm of $CO_2$ was used as a $CO_2$ source to extract sodium from α-$NaMnO_2$ rather than 5% $CO_2$ that was used in the cycling test. The breakthrough curves for $CO_2$ absorption in several α-$NaMnO_2$ slurries with varying $NaMnO_2$ loadings (FIGS. 10A-B) showed excellent initial performance, absorbing more than 75% of $CO_2$ from air. The fraction of sodium extracted by $CO_2$ before the air effluent contained more than 100 ppm of $CO_2$ increased (up to 72%) with the amount of α-$NaMnO_2$ in the slurry (FIG. 10B). This was likely a consequence of the lower initial pH of slurries with low weight loading of α-$NaMnO_2$ (0.2-0.8 wt %) caused by near complete extraction of $Na^+$ from the $NaMnO_2$ layers upon initial introduction of water. In contrast, ~15 wt % of $NaMnO_2$ slurry in water was used in the cycling experiments. The primary reason to use a relatively low $NaMnO_2$ wt % slurry in the proof of concept $CO_2$ DAC experiments was to measure these breakthrough curves in reasonable timescales. The amount of $CO_2$ captured when the $CO_2$ concentration in the effluent recovers to 400 μm was in all cases consistent with ~90% of intercalated $Na^+$ being converted to $Na_2CO_3$ (similar to the case when 5% of $CO_2$ was used). As the weight fraction of $NaMnO_2$ in the slurry increased, the fraction of $Na^+$ extracted before the effluent air contains more than 100 ppm of $CO_2$ was expected to increase.

Each patent, patent application, and publication cited or described in this document or its Attachments is hereby incorporated herein by reference, each in its entirety, for all purposes, or at least for the purposes or in the context where it was cited or referenced.

What is claimed:

1. A process comprising extracting carbon dioxide from an air stream by contacting the air stream with a composition comprising an alkali metal ion-transition metal oxide of empirical formula $A_xMO_2$ ($0.1<x\leq1$) to form a transition metal composition comprising an oxidized ion extracted-transition metal oxide, where A represents the alkali metal ion comprising sodium ion, potassium ion, or a combination thereof and M comprises iron, manganese, or a combination thereof.

2. The process of claim 1, wherein the contacting is done in the presence of water or steam.

3. The process of claim 1, wherein the contacting is done at a temperature in a range of from about 60° C. to 250° C.

4. The process of claim 1, wherein the air stream is atmospheric air.

5. The process of claim 4, wherein the atmospheric air has a $CO_2$ content in a range of from 150 ppm to 500 ppm by weight.

6. The process of claim 1, wherein the air stream containing the carbon dioxide is delivered to the alkali metal ion-transition metal oxide using a solar updraft air tower.

7. The process of claim 1, wherein the alkali metal ion-transition metal oxide is generated in a second process of thermochemically forming $H_2$, $O_2$, or both $H_2$ and $O_2$, each separately, from water, said second process comprising:

(a) contacting a composition comprising a spinel-type transition metal oxide of formula $M_3O_4$ with an alkali metal carbonate, bicarbonate, or mixture thereof in the presence of $H_2O$ at a first temperature in a range of from 450° C. to 1000° C. to form $H_2$, $CO_2$, and the alkali metal ion-transition metal oxide, said alkali metal ion-transition metal oxide having an average transition metal oxidation state that is higher than the average oxidation state of the transition metal in the spinel-type transition metal oxide;

(b) hydrolytically extracting at least a portion of alkali metal ions from the alkali metal ion-transition metal oxide by the reaction with $CO_2$, and liquid $H_2O$ at a second temperature in a range of from 60° C. to 250° C. to form a transition metal composition comprising an oxidized ion extracted-transition metal oxide in which the average oxidation state of the transition metal in the oxidized ion extracted-transition metal oxide is the same as the average oxidation state of the transition metal in the alkali metal ion-transition metal oxide; and (c) thermochemically reducing the transition metal composition of step (b) at a third temperature in a range of from 450° C. to 1150° C., with the associated formation of $O_2$:

wherein the transition metal, M, comprises iron, manganese, or a combination thereof, and the corresponding spinel-type transition metal oxide comprises $Fe_3O_4$, $Mn_3O_4$, or a solid solution or physical mixture thereof; and wherein the alkali metal ion comprises sodium ion, potassium ion, or a combination thereof.

8. The process of claim 7, wherein the $H_2$ and $CO_2$ generated by the second process is captured.

9. The process of claim 7, wherein the $H_2$ and $CO_2$ generated by the second process is captured and converted to (a) syngas via the reverse water gas shift reaction or (b) to methanol by hydrogenation of the $CO_2$ or (c) to higher hydrocarbons by upgrading the $CO_2/H_2$ stream.

10. The process of claim 7, where energy for the process or the second process is derived from solar energy, preferably via solar concentrator.

11. The process of claim 7, wherein the second process is operated one or more times a day or continuously.

12. The process of claim 7, wherein the step (a) of contacting the composition comprising a spinel-type transition metal oxide of formula $M_3O_4$ with an alkali metal carbonate, bicarbonate, or mixture thereof is done stepwise first in the absence and then in the presence of $H_2O$.

13. The process of claim 7, wherein the carbonate, bicarbonate, or mixture thereof comprises a carbonate.

14. The process of claim 7, wherein at least one of the first and third temperatures is in a range of from 750° C. to 850° C.

15. The process of claim 7, wherein the second temperature is (1) in a range of from about 60° C. to about 95° C., at ambient atmospheric pressure or (2) in a range of from about 100° C. to about 250° C., wherein the $CO_2$ is present at a partial pressure in a range of from about 1 bar to about 25 bar.

16. The process of claim 7, wherein the third temperature is in a range of from 550° C. to 1150° C.

17. The process of claim 7, wherein the thermochemical reduction of the oxidized-transition metal oxide results in a regeneration of the spinel-type transition metal oxide of (a).

18. The process of claim 7, wherein the transition metal comprises manganese; the carbonate, bicarbonate, or mixture thereof comprises a carbonate; and the alkali metal ion comprises sodium ion.

19. The process of claim 7, wherein the alkali metal ion is $Na^+$ and the alkali metal ion transition metal oxide comprises a composition having an empirical formula $NaMnO_2$.

20. The process of claim 7, wherein the transition metal composition of step (b) comprises a protonic birnessite, and the thermochemical reduction of this product is done at the third temperature in a range of from 750° C. to 850° C.

21. The process of claim 7, said method comprising:

(a) contacting a composition comprising a spinel-type $Mn_3O_4$ with sodium carbonate in the presence of $H_2O$ at a first temperature in a range of from about 550° C. to about 900° C., to form $H_2$, $CO_2$, and a sodium birnessite-type $A_xMnO_2$ (0<x<1), the sodium birnessite-type manganese dioxide having an average transition metal oxidation state that is higher than the average oxidation state of the transition metal in the spinel-type $Mn_3O_4$;

(b) hydrolytically extracting at least a portion of sodium cations from the sodium birnessite-type manganese dioxide by the reaction with $CO_2$ and liquid $H_2O$ at a second temperature in a range of (1) from about 70° C. to about 90° C. at ambient pressure or (2) from about 140° C. to about 200° C. at a partial pressure of $CO_2$ in a range of from about 3 bar to about 20 bar to form a transition metal composition comprising an protonic birnessite in which the average oxidation state of the transition metal in the protonic birnessite is the same as the average oxidation state of the transition metal in the sodium birnessite-type manganese dioxide; and (c) thermochemically reducing the transition metal composition of step (b) at a third temperature in a range of from about 550° C. to about 900° C., preferably about 850° C., with the associated formation of $O_2$.

22. The process of claim 7, wherein the transition metal comprises iron; the carbonate, bicarbonate, or mixture thereof comprises a carbonate; and the alkali metal ion comprises sodium ion, potassium ion, or a combination thereof.

23. The process of claim 7, wherein the alkali metal ion-transition metal oxide is $NaFeO_2$ or $KFeO_2$, formed by the reactions between $Fe_3O_4$ and sodium carbonate or between $Fe_3O_4$ and potassium carbonate, respectively.

24. The process of claim 7, wherein the alkali metal ion is $Na^+$ or $K^+$ or a combination thereof, and the alkali metal ion-transition metal oxide comprises a composition having a stoichiometry of $NaFeO_2$ or $KFeO_2$.

25. The process of claim 1, wherein the alkali metal ion-stabilized oxidized-transition metal oxide comprises a composition having an empirical formula of $NaMnO_2$, formed by at least one reaction resulting from contacting sodium carbonate and $Mn_3O_4$.

26. The process of claim 25, wherein the alkali metal ion-stabilized oxidized-transition metal oxide comprises $\alpha$-$NaMnO_2$.

* * * * *